(12) United States Patent
Gaspardo et al.

(10) Patent No.: US 8,412,484 B2
(45) Date of Patent: *Apr. 2, 2013

(54) NON-CONTACT SCANNING SYSTEM

(75) Inventors: Steven J. Gaspardo, North Aurora, IL (US); Eugene L. DiMonte, Aurora, IL (US)

(73) Assignee: Gaspardo & Associates, Inc., Batavia, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/910,228

(22) Filed: Oct. 22, 2010

(65) Prior Publication Data

US 2011/0080594 A1    Apr. 7, 2011

Related U.S. Application Data

(63) Continuation of application No. 11/438,181, filed on May 22, 2006, now Pat. No. 7,840,371.

(51) Int. Cl.
*G01C 9/14* (2006.01)
(52) U.S. Cl. .................................................. 702/151
(58) Field of Classification Search .............. 702/95, 702/104, 145, 150, 151, 183; 382/152; 378/4
See application file for complete search history.

(56) References Cited

U.S. PATENT DOCUMENTS

| | | | |
|---|---|---|---|
| 5,023,895 A * | 6/1991 | McCroskey et al. ............. 378/4 |
| 5,784,282 A | 7/1998 | Abitbol et al. |
| 5,820,623 A * | 10/1998 | Ng .................................. 606/1 |
| 5,848,115 A | 12/1998 | Little et al. |
| 5,999,642 A | 12/1999 | Gilliland |
| 6,028,955 A | 2/2000 | Cohen et al. |
| 6,031,225 A | 2/2000 | Stem et al. |
| 6,101,268 A | 8/2000 | Gilliland |
| 6,226,395 B1 | 5/2001 | Gilliland |
| 6,285,959 B1 | 9/2001 | Greer |
| 6,542,249 B1 | 4/2003 | Kofman et al. |
| 6,570,715 B2 | 5/2003 | Chen et al. |
| 6,571,008 B1 | 5/2003 | Bandyopadhyay |
| 6,628,819 B1 | 9/2003 | Huang et al. |
| 6,687,328 B2 | 2/2004 | Bavendiek et al. |
| 6,703,634 B2 | 3/2004 | Ono |
| 6,708,071 B1 | 3/2004 | Turner |
| 6,738,507 B2 | 5/2004 | Liasi et al. |
| 6,834,253 B2 | 12/2004 | Wu et al. |
| 6,850,331 B1 | 2/2005 | Ferber et al. |
| 6,912,293 B1 | 6/2005 | Korobkin |
| 6,917,701 B2 | 7/2005 | Martins |
| 7,185,412 B2 | 3/2007 | Penick et al. |

* cited by examiner

*Primary Examiner* — Mohamed Charioui
(74) *Attorney, Agent, or Firm* — John S. Paniaguas; Katten Muchin Rosenman LLP

(57) ABSTRACT

A non-contact scanning system for three dimensional non-contact scanning of a work piece is disclosed for use in various applications including reverse engineering, metrology, dimensional verification and inspection The scanning system includes a scanner carried by an arcuately configured gantry assembly and a fixture for carrying a work piece. The gantry assembly includes a fixed arcuately shaped gantry member and a telescopic arm that is movable in an arcuate direction relative to a rotary table that carries the object to be scanned. A scanner is mounted on the end of the telescopic member and is movable in a radial direction. Objects to be scanned are mounted on a rotary table that is also movable in an X-Y direction or alternatively in the X, Y and Z directions under the control of a motion control subsystem, a machine control user interface subsystem and an image capture.

7 Claims, 22 Drawing Sheets

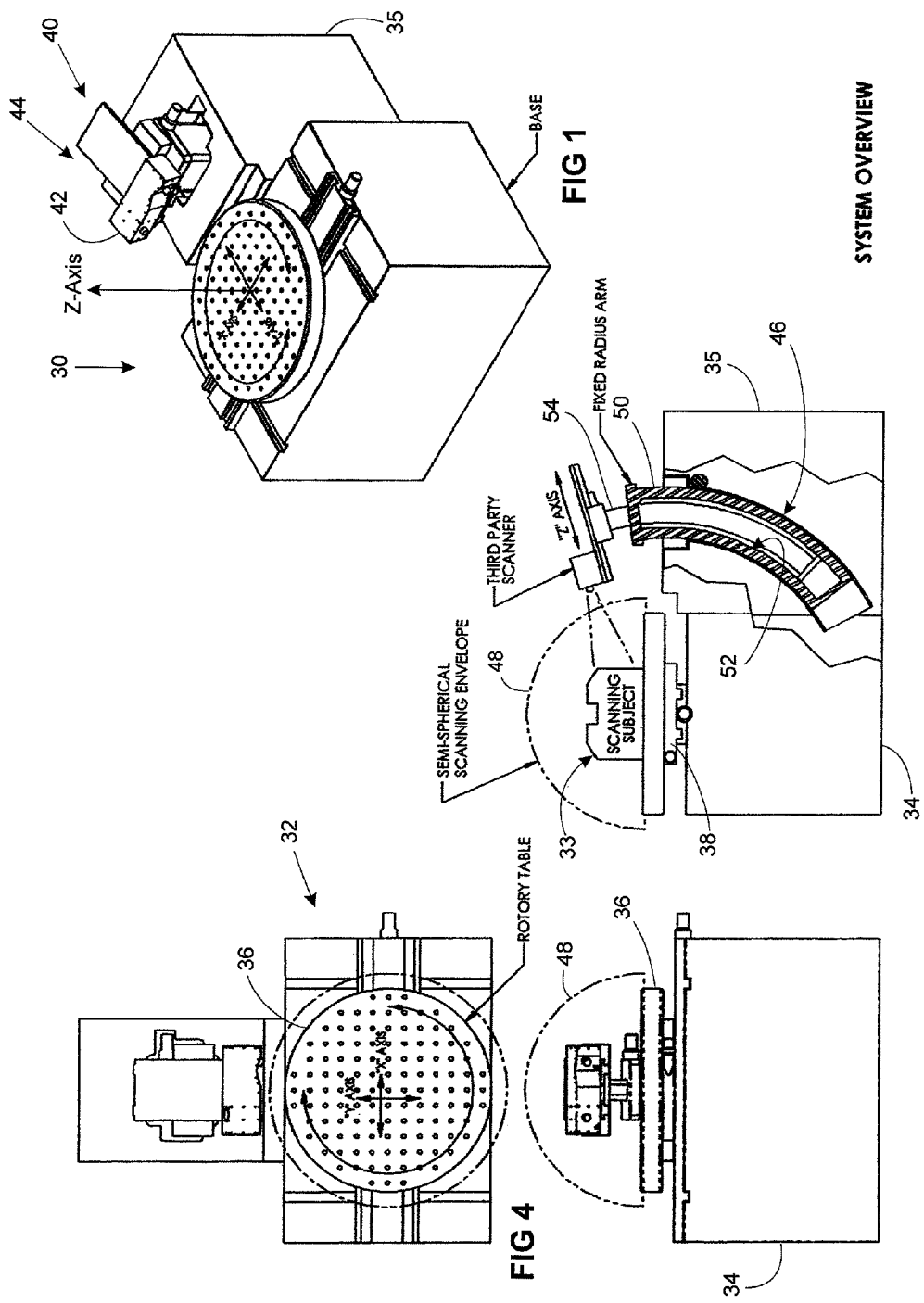

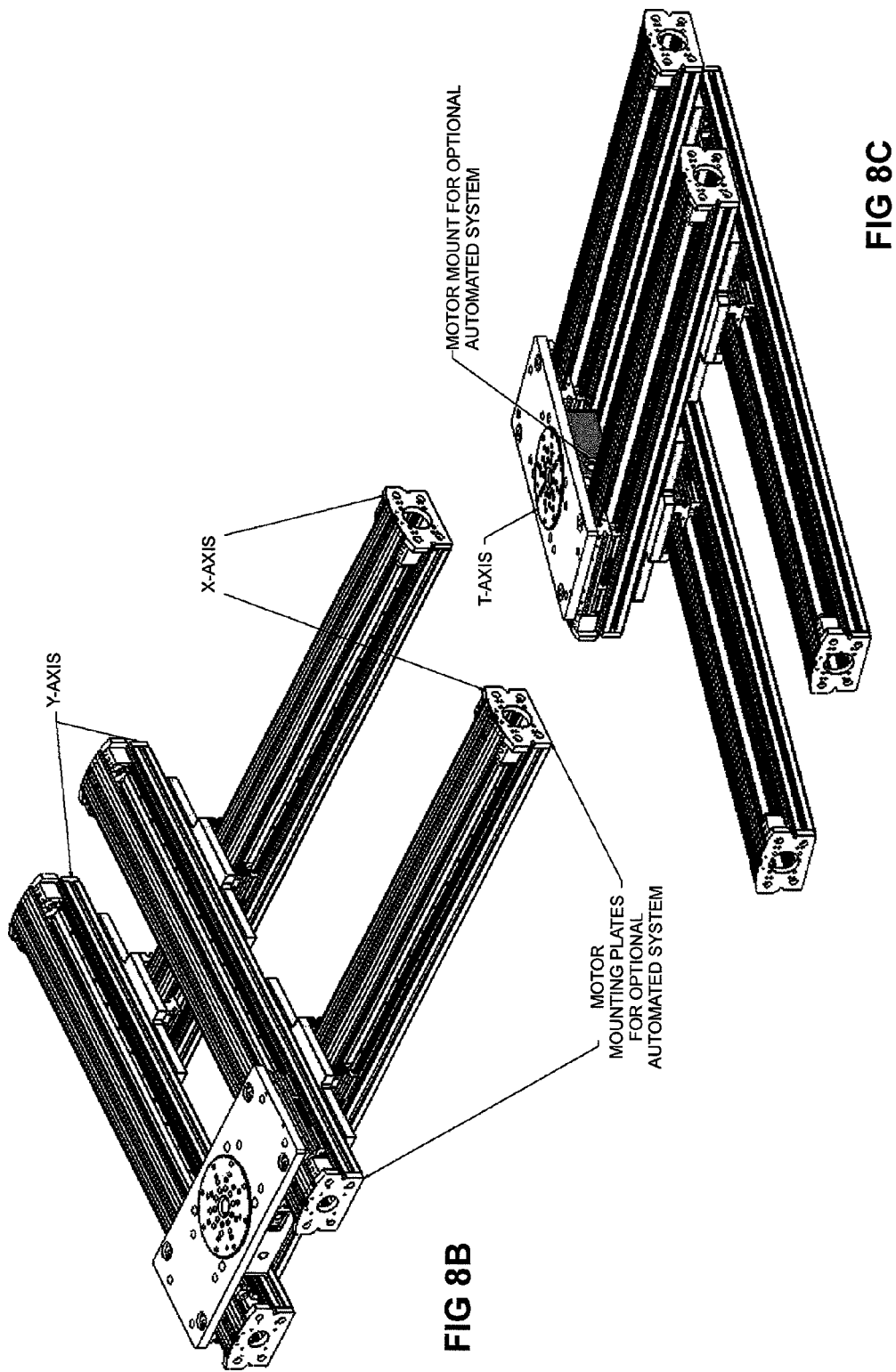

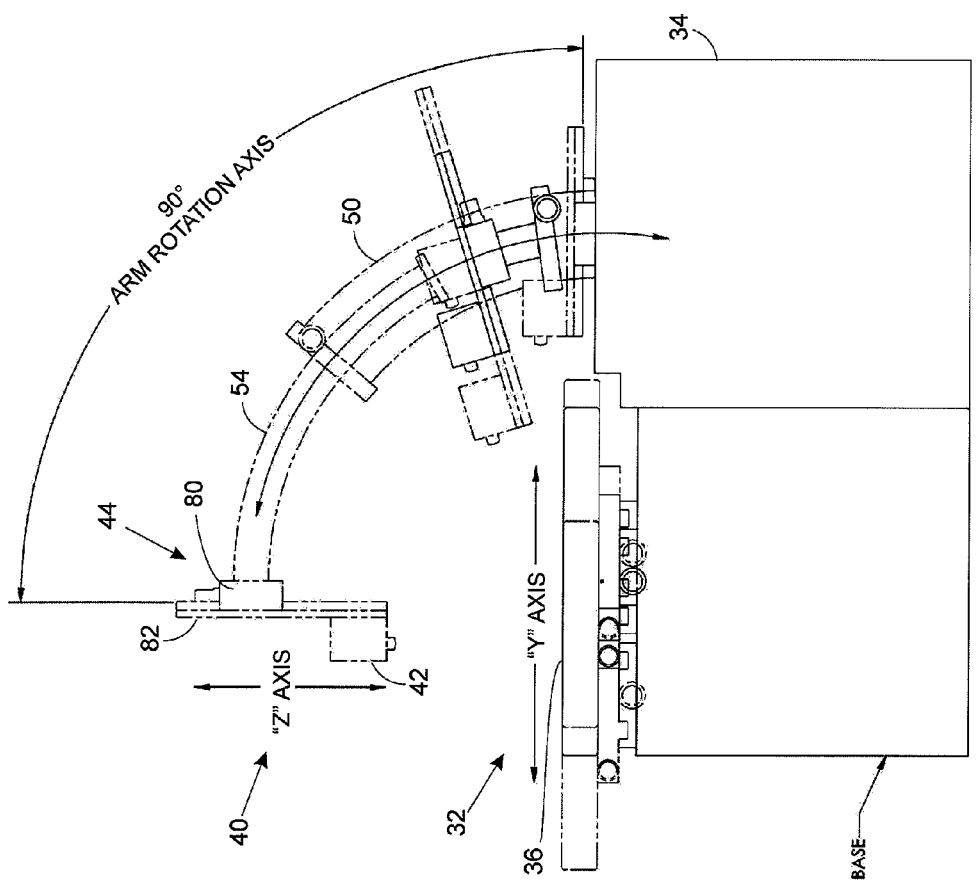

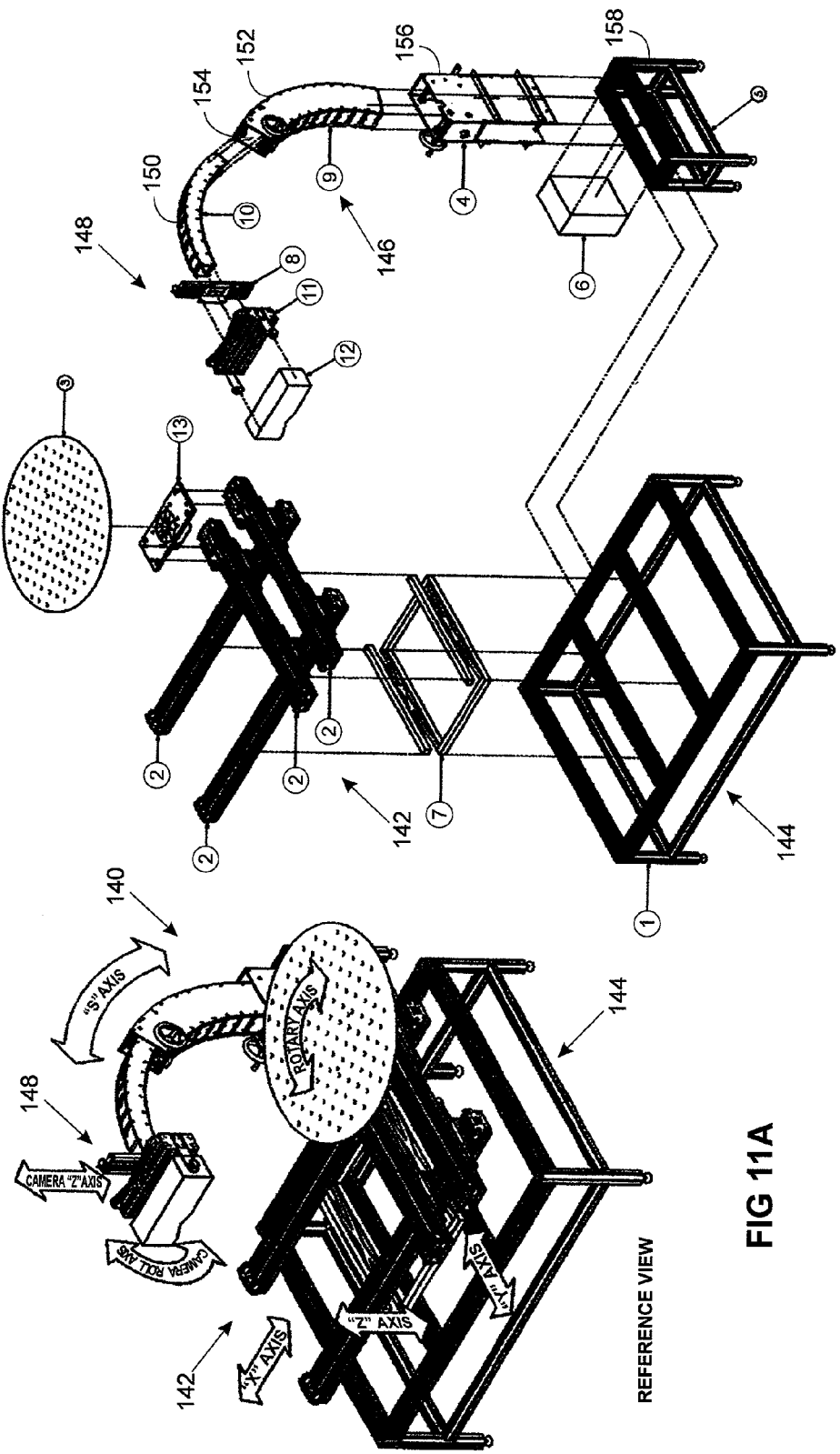

NON-CONTACT SCANNING SYSTEM

CROSS REFERENCE TO RELATED APPLICATIONS

This application is a continuation of U.S. patent application Ser. No. 11/438,181, filed on May 22, 2006, now U.S. Pat. No. 7,840,371.

BACKGROUND OF THE INVENTION

1. Field of the Invention

The present invention relates to a non-contact scanning system and more particularly to a three dimensional non-contact scanning system for use in various applications including reverse engineering, metrology, dimensional verification and inspection, which includes a scanner assembly carried by an arcuately configured gantry assembly and a fixture assembly for carrying the work piece and enabling an spherically shaped scanning envelope to facilitate the formation of a three dimensional model of an object or work piece.

2. Description of the Prior Art

Various scanning systems are known in the art for scanning objects for either dimensional verification or reverse engineering of a work piece. Examples of such systems are disclosed in U.S. Pat. Nos. 5,784,282; 5,848,115; 5,999,642; 6,028,955; 6,031,225; 6,101,268; 6,226,395; 6,285,959; 6,542,249; 6,570,715; 6,571,008; 6,628,819; 6,687,328; 6,703,634; 6,708,071; 6,738,507; 6,834,253; 6,850,331; 6,912,293 and 6,917,701, hereby incorporated by reference. Such systems normally include a movable fixture for carrying the work piece and a stationary or movably mounted scanner for scanning the work piece. Many known scanners are used for three dimensional scanning of an object. For example, U.S. Pat. No. 5,848,115 discloses a three dimensional scanning system which utilizes computerized tomography, used for dimensional verification of a work piece. The scanning system includes an x-ray source and detector (hereinafter referred to as an "x-ray scanner") mounted to a gantry which allows the scanner to move linearly along the X and Z axes. The work piece to be scanned is mounted on a fixture that includes rotatable table which is also mounted for rectilinear movement along the X and Y axes. U.S. Pat. Nos. 5,999,642; 6,101,268; and 6,226,395 also illustrate a three dimensional scanning system which includes a scanning device (in this case a camera) mounted on a gantry which allows the scanning device to move linearly along the X, Y and Z axes relative to the object to be scanned. U.S. Pat. No. 6,628,819 discloses a three dimensional scanning system which includes a fixture for carrying a work piece to be scanned, formed as a rotatable table. The scanner is fixed relative to the rotatable table so that locator markings on the rotatable data are always in the field of view of the scanner. U.S. Pat. No. 6,687,328 also discloses a three dimensional scanning system which includes an x-ray scanner mounted for movement relative to the X-Y axes. The scanning system also includes a fixture for carrying the work piece to be scanned. The fixture is mounted under the platform and is configured to be rotated about the X and Y axes.

The configurations of the three dimensional scanning systems mentioned above constrain the size the work piece that can be scanned. In order to solve this problem, U.S. Pat. No. 6,738,507 discloses a three dimensional free standing scanning system for imaging relatively large objects on the ground or in situ. This scanning system includes a scanners mounted at the end of a free standing robot arm configured with multiple degrees of freedom that allows the scanner to scan the object from many different positions and angles.

The configurations of the various three dimensional scanning systems mentioned above also result in other problems. For example, such configurations require multiple scans in order to form a three dimensional model of the work piece. As such, these systems require computationally intensive calculations to spatially orientate each of the two dimensional images from the scanner in order to form a three dimensional model of the work piece. Thus there is a need to provide a three dimensional scanning system which facilitates formation of a three dimensional model of the work piece.

SUMMARY OF THE INVENTION

The present invention relates to a non-contact scanning system for three dimensional non-contact scanning of a work piece for use in various applications including reverse engineering, metrology, dimensional verification and inspection The scanning system includes a scanner carried by an arcuately configured gantry assembly and a fixture for carrying a work piece. The gantry assembly includes an arcuately shaped gantry member and a telescopic member that is movable in an arcuate direction relative to a rotary table that carries the object to be scanned. A scanner is mounted on the end of the telescopic member and is movable in a radial direction. Objects to be scanned are mounted on a rotary table that is also movable in an X-Y direction or alternatively in the X, Y and Z directions under the control of a control system. The configuration of the scanning system in accordance with the present invention provides a spherically shaped scanning envelope which facilitates three dimensional modeling of the work piece.

DESCRIPTION OF THE DRAWING

These and other advantages of the present invention will be readily understood with reference to the following specification and attached drawing wherein:

FIG. 1 is an isometric view of one embodiment of the non-contact scanning system in accordance with the present invention which includes a fixture assembly movable in the X and Y directions.

FIG. 2 is a side view of the non-contact scanning system illustrated in FIG. 1, with a portion of the base partially broken away illustrating an arcuately configured gantry assembly in section and further illustrating the semi-spherical scanning envelope of the scanning system.

FIG. 3 is a front view of the non-contact scanning system illustrated In FIG. 1 which also illustrates the system's scanning envelope.

FIG. 4 is a top view of the non-contact scanning system, illustrated in FIG. 1

FIGS. 8A-8C are isometric views of a portion of the fixture assembly with exemplary drive mechanisms to provide linear movement of a work piece in a direction parallel to the X and Y axes and rotary movement about the Z axis.

FIG. 9B is a more detailed side view of the non-contact scanning system illustrated in FIG. 1, illustrating different positions of the fixture assembly relative to a Y axis and different arcuate positions of the gantry arm assembly.

FIG. 11A is another alternate embodiment of the non-contact scanning system that includes a fixture movable in the X, Y and Z directions.

FIG. 11B is an exploded isometric view of the non-contact scanning system illustrated in FIG. 11A.

DETAILED DESCRIPTION

Figure 5:
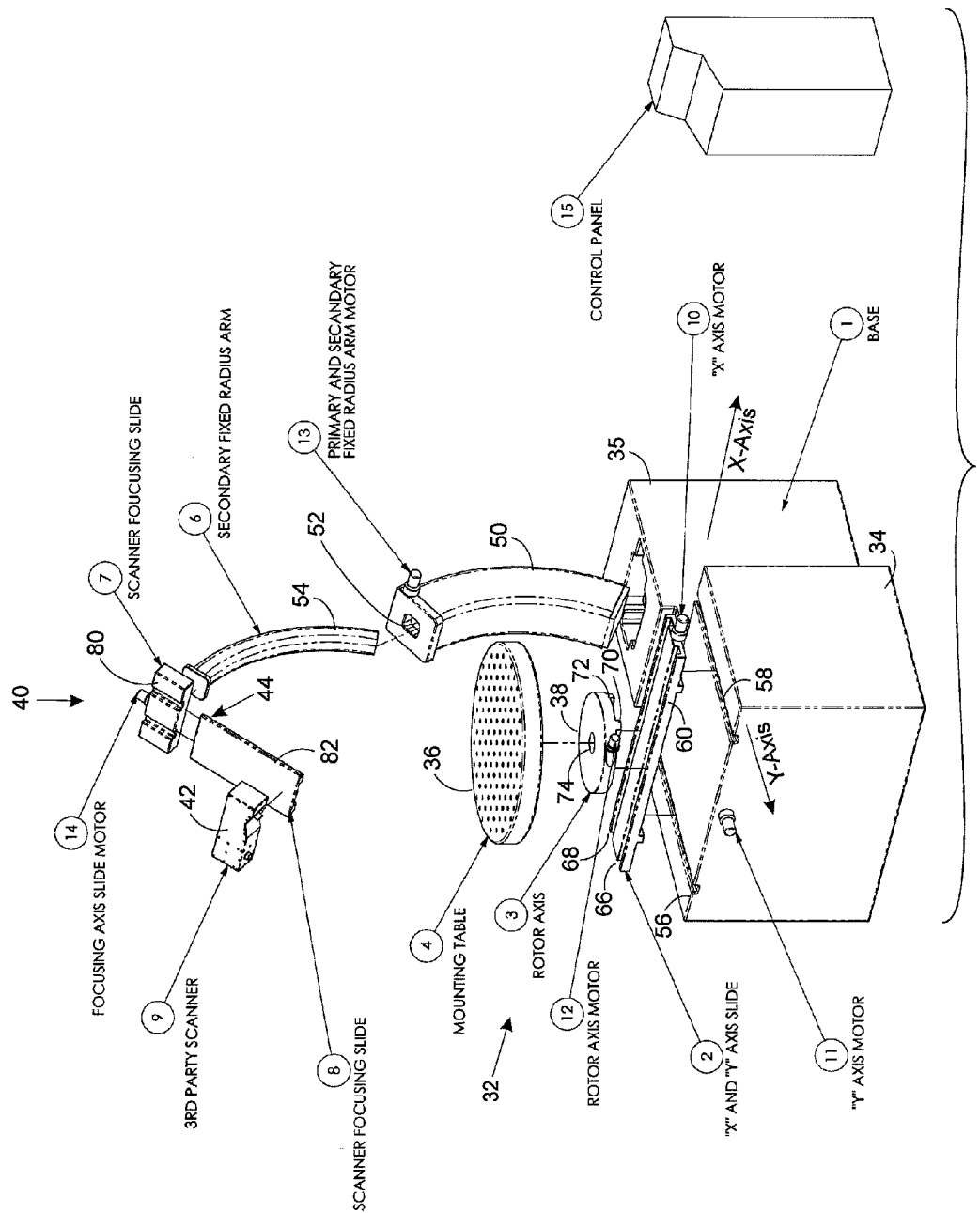
FIG. 5 is an exploded isometric view of the non-contact scanning system illustrated in FIG. 1.

The present invention relates to non-contact three dimensional scanning system for use in various applications, including reverse engineering, metrology, dimensional verification and inspection The scanning system includes a scanner carried by an arcuately configured gantry assembly and a fixture for carrying a work piece. The scanning system includes a scanner carried by an arcuately configured gantry assembly and a fixture for carrying a work piece. The gantry assembly includes an arcuately shaped radius arm and a telescopic member that is movable in an arcuate direction relative to a rotary table that carries the object to be scanned. A scanner is mounted on the end of the telescopic member and is movable in a radial direction. Objects to be scanned are mounted on a rotary table that is also movable in an X-Y direction or alternatively in the X, Y and Z directions. The configuration of the scanning system in accordance with the present invention provides a spherically shaped scanning envelope which facilitates three dimensional modeling of the work piece.

Three exemplary embodiments are described and illustrated. More particularly, FIGS. 1-9 illustrate a first embodiment of the non-contact scanning system which includes a fixture carried by a base which includes a rotatable table that is also configured for movement in the X and Y directions. FIGS. 10A and 10B illustrate a second embodiment, similar to the embodiment illustrated in FIGS. 1-9, but with a fixture assembly that is configured for movement along the X, Y and Z directions and a manually movable scanner assembly that has three degrees of freedom. FIGS. 11A and 11B illustrate a third embodiment similar to the embodiment illustrated in FIGS. 10A and 10B, but with a fixture that is supported with a frame.

First Embodiment

Referring first to FIGS. 1-9, the non-contact scanning system is generally identified with the reference numeral 30. The non-contact scanning system 30 includes a fixture assembly, generally identified with the reference numeral 32, for carrying a work piece or object to be scanned 33 and a scanner assembly 40. In this embodiment, the fixture assembly 32 is configured with two degrees of freedom; namely, rectilinear movement relative to the X and Y axes. The scanner assembly 40 is configured with a single degree of freedom; namely, arcuate movement in a radial direction, relative to the work piece 33.

The fixture assembly 32 is carried by a base 34, configured, for example, as a rectangular box, for carrying the fixture assembly 32. The fixture assembly 32 includes a rotatable table 36, for example, a circular table, for carrying the work piece 33. The rotatable table 36 is mounted for rotation about a Z axis. The rotatable table 36 is mounted to a rotary drive bracket 38, which, in turn, is also configured for rectilinear movement relative to the X and Y axes.

The scanner assembly 40 includes a scanner 42, for example, a camera, for example, a Model No. Comet 250 as manufactured be Steinbechler GmbH. The scanner 42 is securely mounted to a focusing slide assembly 44, configured for radial movement relative to the work piece 33, as best shown in FIG. 2. In accordance with an important aspect of the invention, the focusing slide assembly 44, in then, is carried by the gantry assembly 46, which is configured for arcuate movement relative to the work piece, as best shown in FIG. 2.

Figures 7A, 7B:
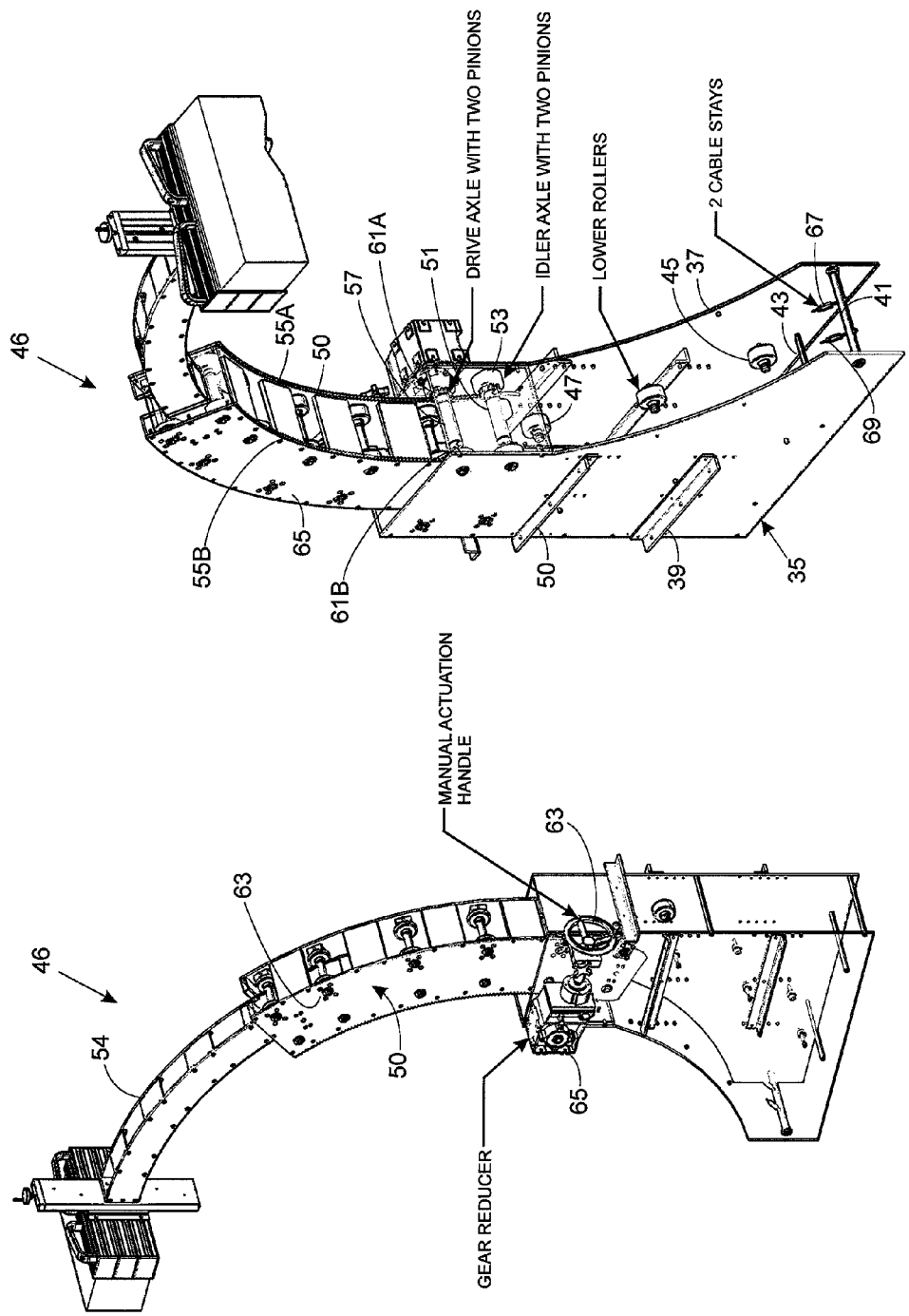
FIGS. 7A and 7B are isometric views of an exemplary gantry assembly configured with a manual actuator.

As best shown in FIG. 2, the gantry assembly 46 includes a radius arm 50, carried by the base 35. The radius arm 50 is configured to slidably receive a telescopic member 54. The radius arm 50 may also be configured to be slidably received in the base 35 to enable the radius arm 50 to be extended to an extended position, as shown in FIGS. 7A and 7B, and retracted to a retracted position, as generally shown in FIG. 2. The scanner assembly 40 is mounted to one end of the telescopic member 54. Such a configuration allows for an arcuate scanning envelope 48, for example, a spherically shaped scanning envelope, as shown in FIGS. 2 and 3, which facilitates three-dimensional modeling of the work piece.

An exemplary embodiment of the non-contact scanning system 30 is illustrated in FIG. 5. In this embodiment, the base 34 is formed with a pair of spaced apart tracks 56 and 58, disposed generally parallel to the Y axis. The tracks 56 and 58 are configured to slidably receive a sliding bracket 60. In particular, the sliding bracket 60 includes a pair of spaced apart extending ribs 62 and 64, formed on the underside of the slide bracket 60. The ribs 62 and 64 are configured to be received in slots 56 and 58, formed in the base 34, to enable the sliding bracket 60 to move in a direction parallel to the Y axis. The top side of the sliding bracket 60 is formed with a pair of spaced apart slots or tracks 66 and 68, formed generally parallel to the X axis. The tracks 66 and 68 enable rectilinear movement of the rotary drive bracket 38 relative to the X axis. More particularly, the under side of the rotary drive bracket 38 is also formed with a pair of extending ribs 70 and 72 that are configured to be received in the tracks 66 and 68 formed on the top side of the sliding bracket 60 to enable rectilinear movement of the sliding bracket 60 in a direction parallel to the X axis.

Figure 8A:
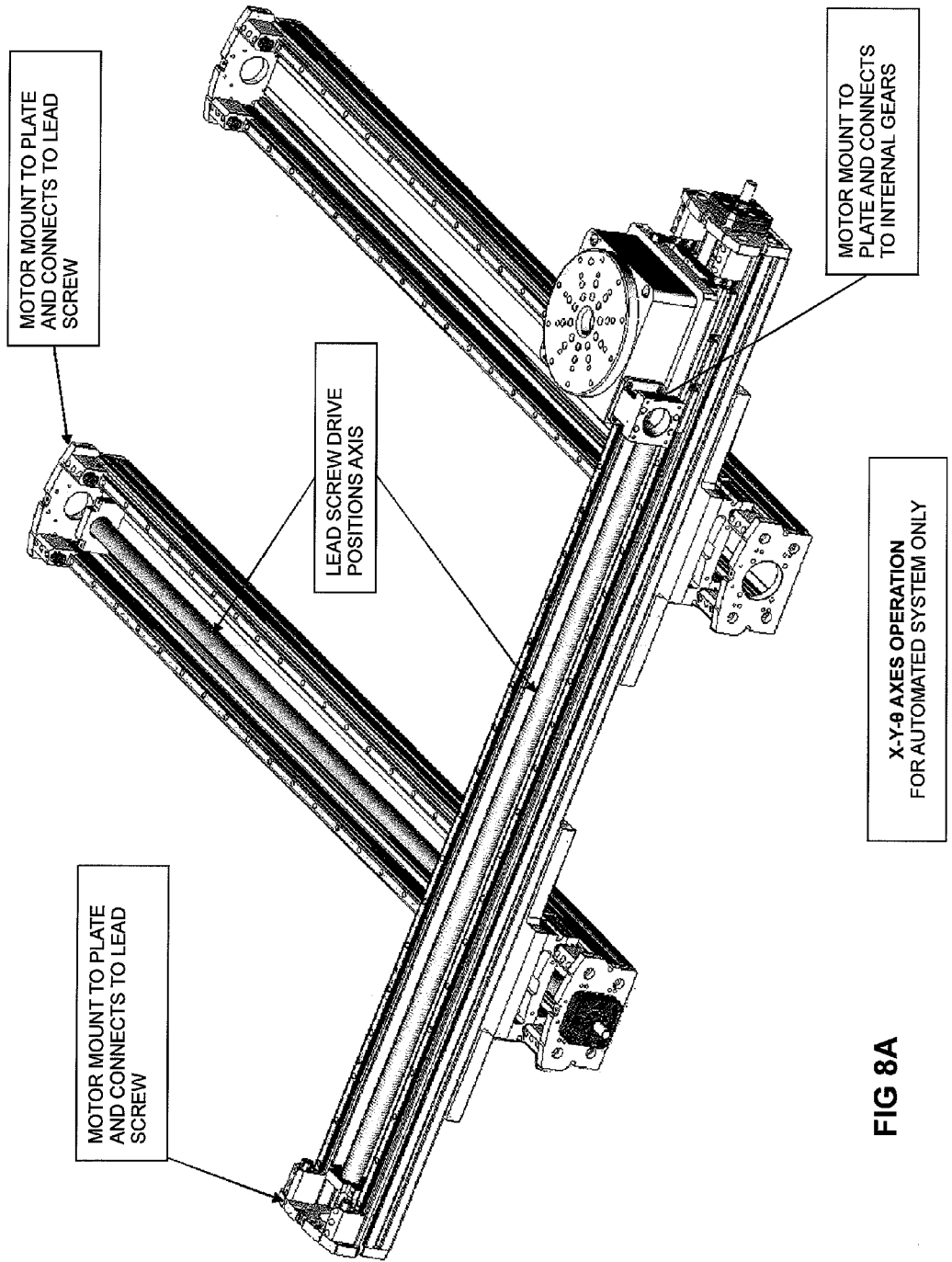

As shown in FIGS. 8A-8C, lead screw mechanisms may be used to drive the sliding bracket 60 along the Y axis as well as the rotary bracket 38 along the X-axis. Motors (not shown) may be mounted to motor mounts juxtaposed adjacent the lead screw mechanisms for automated movement relative to the X and Y axis.

The rotary drive bracket 38 includes a central aperture 74. The central aperture 74 is adapted to receive a shaft (not shown) formed on the under side of the rotating table 36. The shaft may be connected to a gear mechanism, for example, as illustrated in FIG. 8A, to enable the rotary drive bracket 38 to rotate about the Z axis. A motor (not shown) may be mounted to motor mount, juxtaposed adjacent the gear mechanism for automated rotary movement. Such a configuration enables rotary movement of a work piece 33 carried by the table 36 as well as rectilinear movement in directions parallel to the X and Y axes.

The gantry assembly 46 includes a radius arm 50 that is slidably carried by the base 35. In particular, the base 35 is configured to slidably carry the radius arm 50. An exemplary configuration for the gantry assembly 46 is illustrated in FIGS. 7A-7D. Referring first to FIGS. 7A and 7B, the gantry assembly 46 is illustrated and includes a base 35 formed with a pair of spaced-apart side walls 37 and 39. One or more pins 41, 43 are used to connect the spaced-apart side walls 37, 39 together, as shown. Additionally, a plurality of rollers 45, 47 may be rotatably attached to the inside surfaces of the side walls 37 and 39 which act as a support and guide for the radius arm 54 as it is moved to an extended position as shown in FIG. 7B and a collapsed position as generally shown in FIG. 2. An idler axle 51 may be also provided which includes a pair of spaced-apart pinion gears 53, used to drive a pair of spaced-apart gear racks 55a and 55b formed on the arm of the telescopic member 50. A drive axle 57 is provided that is connected between the spaced-apart side walls 37 and 39. The drive axle 57 is provided with a pair of spaced-apart pinions 61a and 61b, used to drive the gear racks 61a, 61b formed on the underside of the radius arm 50. As shown in FIG. 7A, a manual actuation arm 63 in combination with a gear reducer 65 may be used to manually extend and retract the radius arm 50. Alternatively, a motor (not shown) may be attached to a gear box (not shown) for automated movement of the radius arm 54 and telescopic member 50.

Figure 7D:
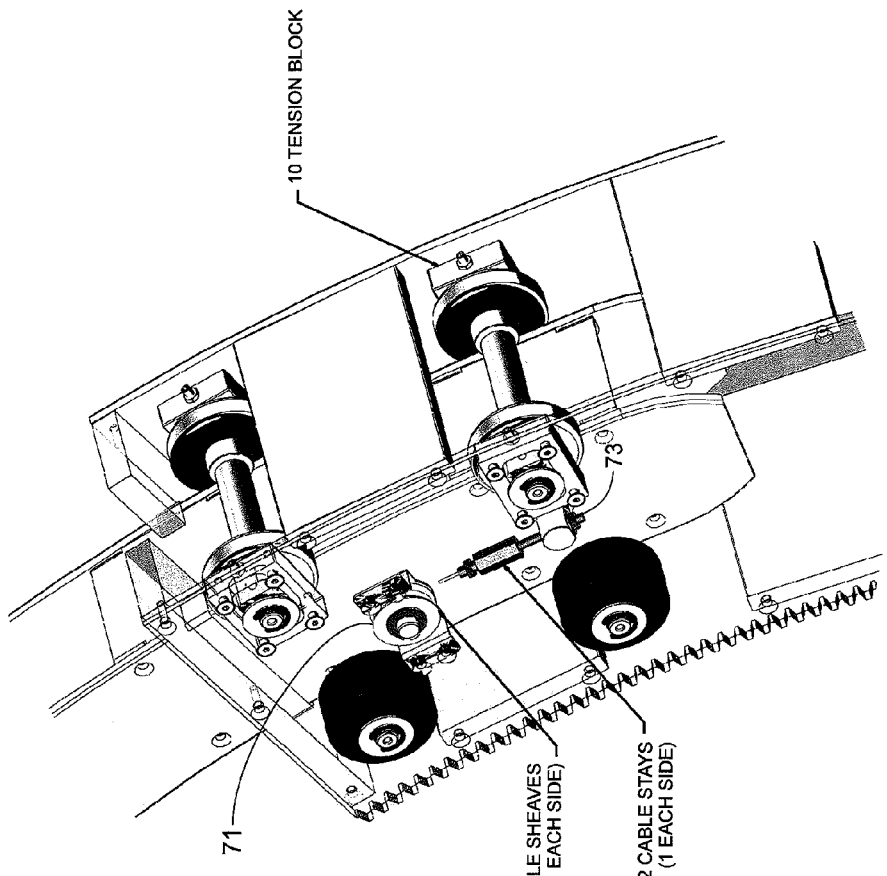
FIG. 7D is an enlarged view of a portion of the gantry assembly illustrated in FIG. 7B.
Figure 7C:
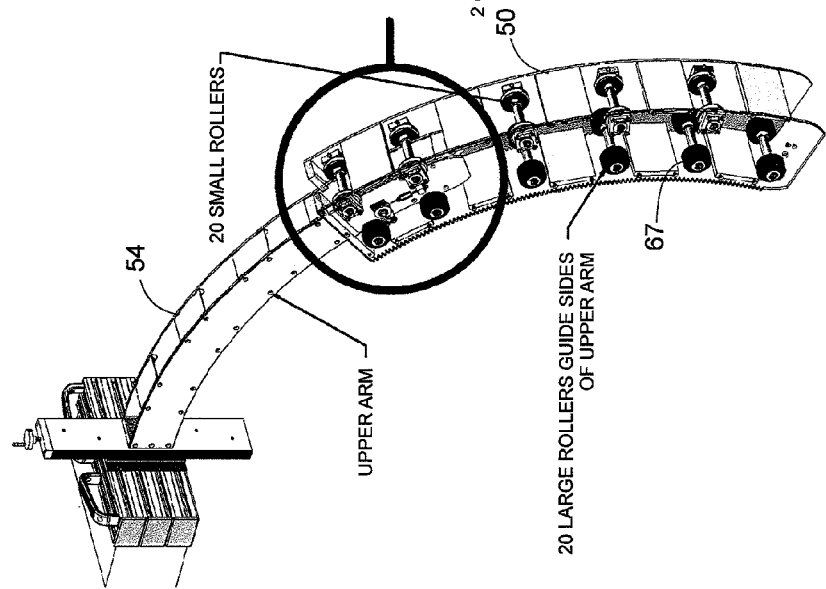
FIG. 7C is an isometric view of an exemplary gantry assembly shown in section, illustrating only the radius arm and the telescopic member in accordance with the present invention.

Referring to FIGS. 7C and 7D, the radius arm 50 is formed with a pair of spaced-apart side walls 63 and 65. A plurality of rollers, generally shown in FIGS. 7C and 7D and identified with the reference numeral 67, are used to guide the telescopic member 50 within the radius arm 50.

Operation of the telescopic member 54 may be controlled by way of a pair of cables 67 and 69 attached to the base 35. As best shown in FIG. 7B, the telescopic member 54 includes a sheave wrap 71 and a cable stay 73. The cables 67, 69 are wrapped around the sheave wrap 71 on each side of the telescopic member 54 and attached to the cable stays 73.

Thus, as the radius arm 50 is extended from the base 35, the cables 67, 69 cause the telescopic arm 54 to be extended as well. As the radius arm 50 is retracted into the base 35, the telescopic member 54 retracts into the radius arm 50. The configuration enables arcuate movement of the telescopic member 54 and radius arm 50 in order to provide a arcuately shaped scanning envelope 48 (FIG. 2).

One end 78 of the telescopic member 54 is configured to receive the scanner assembly 40. The scanner assembly 40 includes a slide retainer 80 and a slide 82. The slide retainer 80 is stationary mounted relative to the telescopic member 54. The slide retainer 80 is configured to slidably receive the slide 82 to enable radial movement relative to the work piece 33, for example, by way of a conventional rack and pinion arrangement, not shown, which may be motorized in the same manner as discussed above. The scanner 42 is rigidly mounted to one end of the slide 82. The configuration allows radial movement of the scanner 42 in order to allow the scanner 42 to be focused relative to the work piece 33.

Figure 9A:
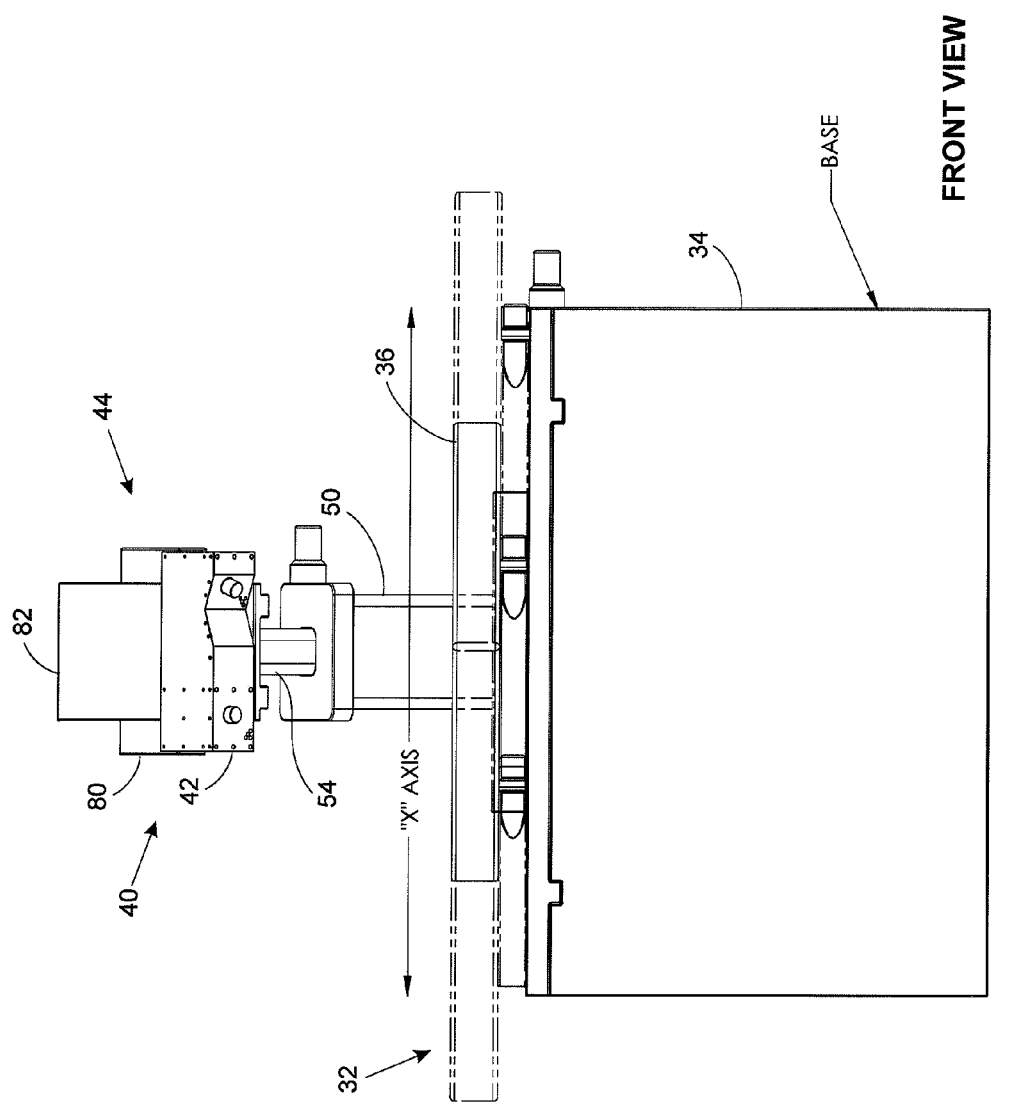
FIG. 9A is a more detailed front view of the non-contact scanning system illustrated in FIG. 1, illustrating different positions of the fixture assembly relative to an X axis.
Figure 10B:
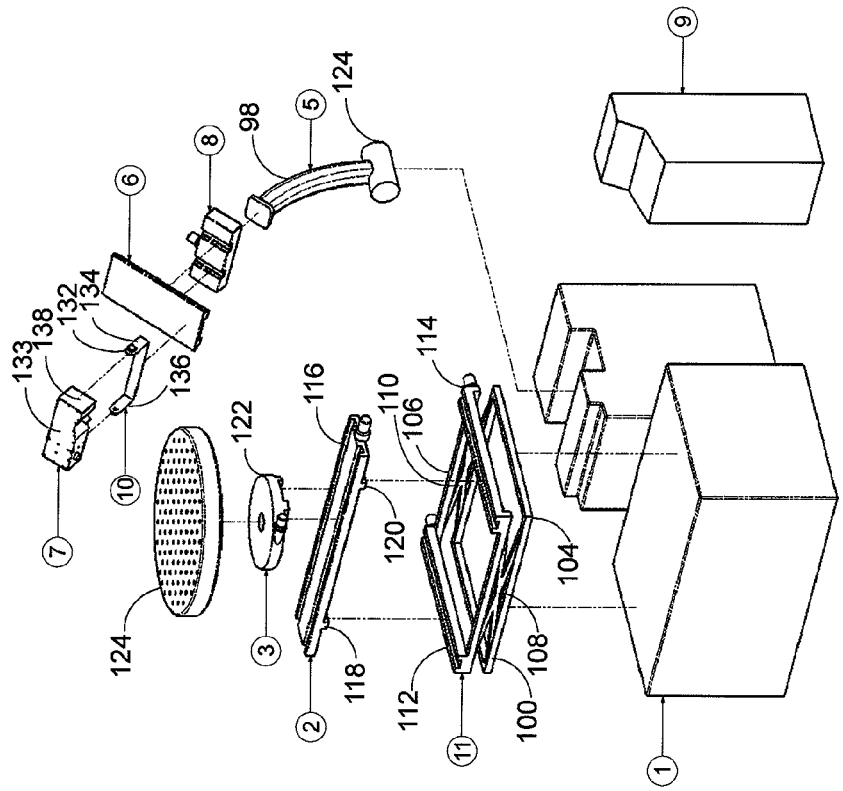
FIG. 10B is an exploded isometric view of the non-contact scanning system illustrated in FIG. 10A.
Figure 10A:
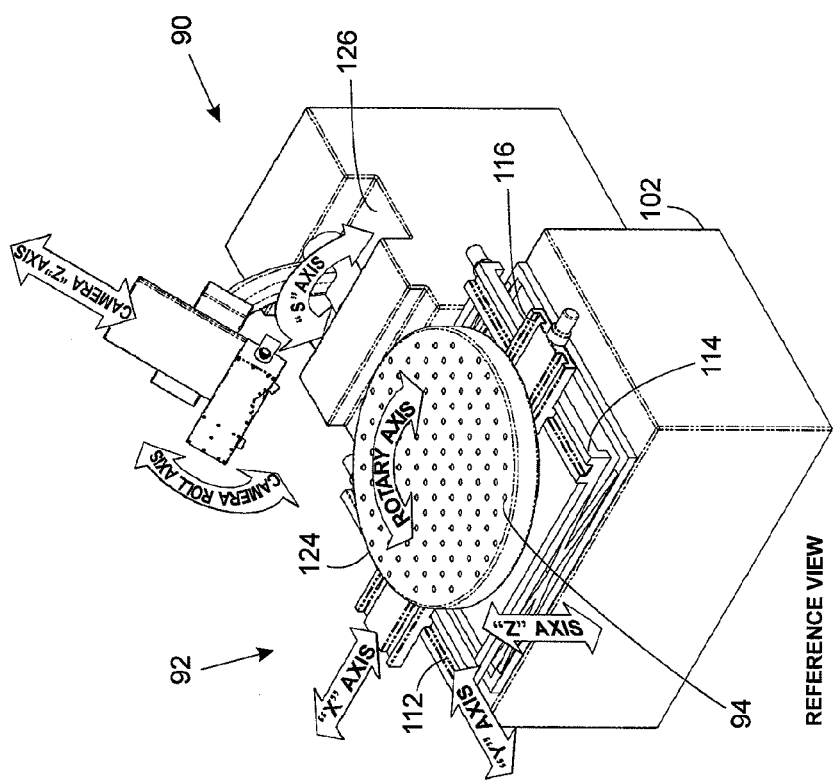
FIG. 10A is a perspective view of an alternate embodiment of a non-contact scanning system in accordance with the present invention that includes a fixture assembly that is movable in the X, Y and Z directions and a scanner assembly that has three degrees of freedom.

FIG. 9A illustrates an exemplary range of motion of the fixture assembly 32 in a direction parallel to the X axis. FIG. 9B illustrates an exemplary range of fixture assembly in a direction parallel to the Y axis. FIG. 9B also illustrates an exemplary range of motion of the telescopic member 54 in an arcuate direction as well as an exemplary range of motion of the scanner 40 in a radial direction with respect to a work piece 33 (FIG. 2).

Second Embodiment

The second embodiment of the non-contact scanning system is illustrated in FIGS. 8A and 8B and generally identified with the reference numeral 90. In this embodiment, the fixture assembly, generally identified with the reference numeral 92, includes a rotatable table 94 with four degrees of freedom; rectilinear movement parallel to the X, Y and Z axes and rotary movement about an axis parallel to the Z axis. In this embodiment, the scanner assembly 96 is mounted on one end of a gantry arm 98 that is mounted for rotation about an axis parallel to the Y axis. The scanner assembly 96 is configured to provide two additional degrees of freedom: rotary movement relative to the X axis and radial movement relative to the work piece 33.

Figure 6:
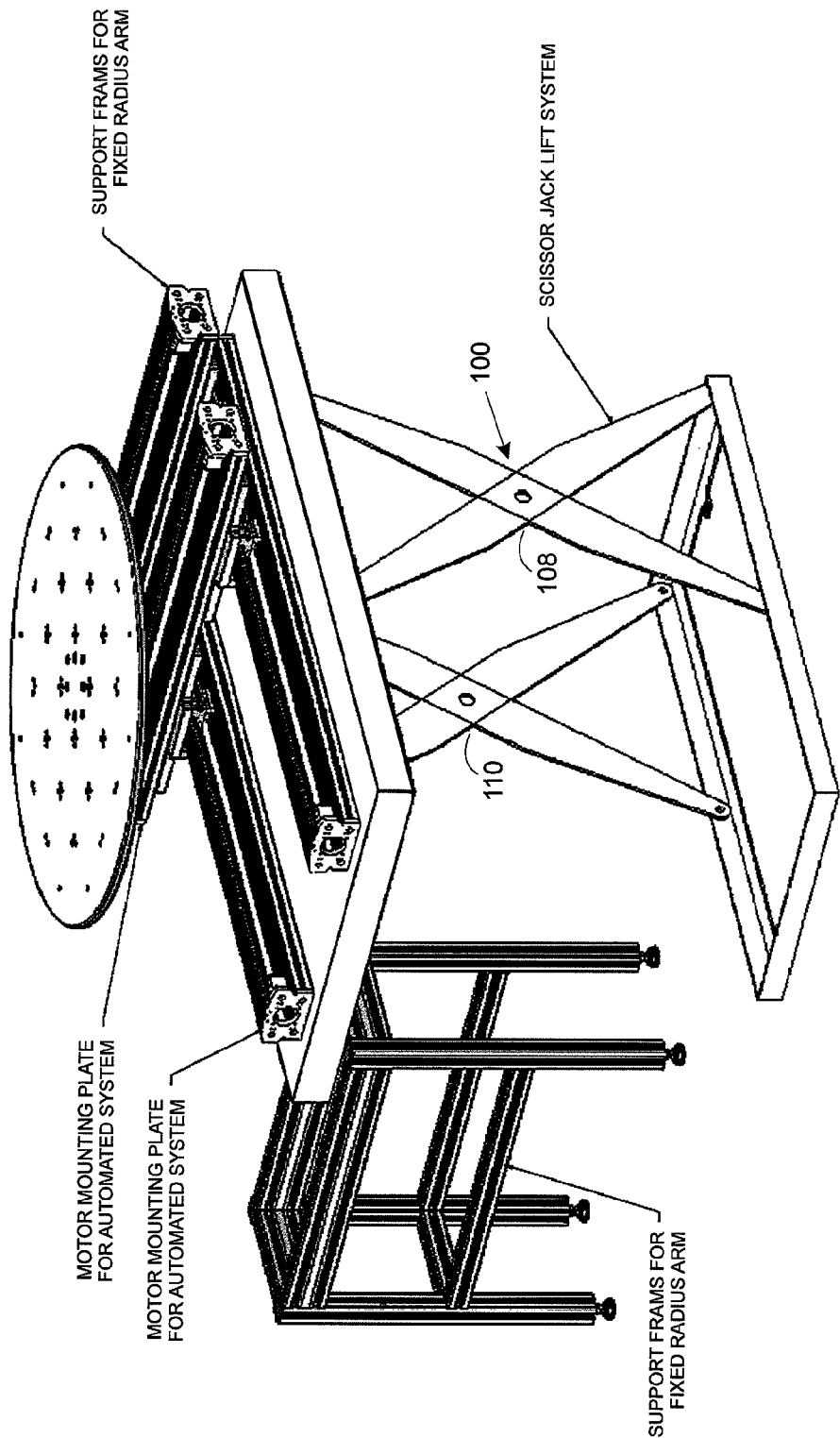
FIG. 6 is an isometric view of an exemplary fixture assembly, configured to provide linear movement to a work piece in a direction parallel to the X, Y and Z axes as well as rotary movement about the Z axis.

The fixture assembly 92 includes a lift assembly 100 that is carried by a base 102. The lift assembly 100 includes bottom frame member 104 and a top frame member 106. A pair of scissor mechanisms 108 and 110, for example, as illustrated in FIG. 6, may be used to couple the top frame member 106 and the bottom frame member 104 together and enable the distance between the top frame member 106 and the bottom frame member 104 to be varied. A conventional lift table with integral scissor mechanisms may be used, for example, a Backsaver Lite lift table, as manufactured by Southwork Products.

The top frame member 106 is formed with a pair of spaced apart tracks 112, 114, generally parallel to the Y axis. The tracks 112, 114 are configured to receive a sliding bracket 116. In particular, the bottom side of the sliding bracket 116 is formed with a pair of spaced apart ribs 118 and 120, configured to be received in the tracks 112 and 114 to enable the sliding bracket 116 to move in a direction generally parallel to the Y axis.

The fixture assembly 92 also includes a rotary drive bracket 122, coupled to the slide bracket 116 a similar manner as described above for movement in a direction generally parallel to the X axis. The fixture assembly 92 also includes a table 124 that is rotatably coupled to the rotary drive bracket 122 in a similar manner as discussed above for rotary movement about an axis generally parallel to the Z axis.

In this embodiment, the scanner assembly 96 includes a one-piece arcuately shaped gantry arm 98. The gantry arm 98 is configured for rotary movement about the Y axis. In particular, one end of the gantry arm 98 is formed with an axle 124. The base 102 is formed a slot 126 with the width selected to similar to the length of the axle 124 so as to cause a friction fit and enable the gantry arm 98 to rotate relative to the Y axis.

The other end of the gantry arm 98 is used to carry the scanner assembly 96. The scanner assembly 96 includes a slide retainer 128 for receiving a slide 130. As mentioned above, the slide retainer 128 and slide 130 allow for radial movement relative to a work piece 33 (FIG. 2).

A scanner bracket 132 is mounted on one end of the slide 130 for rotably carrying a scanner 133. The scanner bracket 132 is formed as a u-shaped member with a pair of spaced apart arms 134 and 136. An extending end of each of the arms 134 and 136 is formed with an inwardly facing protuberance (not shown) that are adapted to be received in apertures 138 in the scanner as shown to enable the scanner 133 to rotate relative to the X axis.

Third Embodiment

A third embodiment of the non-contact scanning system in accordance with the present invention is illustrated in FIGS. 11 and 11B and generally identified with the reference numeral 140. The non-contact scanning system 140 includes a fixture assembly, generally identified with the reference numeral 142, carried by a frame 144. The non-contact scanning system 140 also includes a gantry assembly 146 and a scanner assembly 148. The fixture assembly 142 is similar to the fixture assembly 92, illustrated in FIGS. 10A and 10B and provides four degrees of freedom. The scanner assembly 148 is similar to the scanner assembly 96, illustrated in FIGS. 10A and 10B and is configured to enable radial movement of the scanner relative to a work piece 33 for focusing and is also configured for rotary movement about the X axis.

The scanner assembly is mounted to a free end of a telescoping arm 150 of the gantry assembly 146. The gantry assembly 146 also includes a radius arm 152, formed with a slot 154 for slidably receiving the telescopic member 150, for example, in a manner as discussed above. In this embodiment, the radius arm 152 is carried by a radius arm base 156, which, in turn, is carried by a separate frame 158. A controller 160, for example, a Siemens Model NSPP, used for controlling the gantry assembly 146 is also carried by the frame 148. The gantry assembly 146 provides an additional degree of freedom for the scanner; namely arcuate movement relative to the work piece 33 in order to a spherically shaped scanning envelope.

CONTROL SYSTEM

Figure 12:
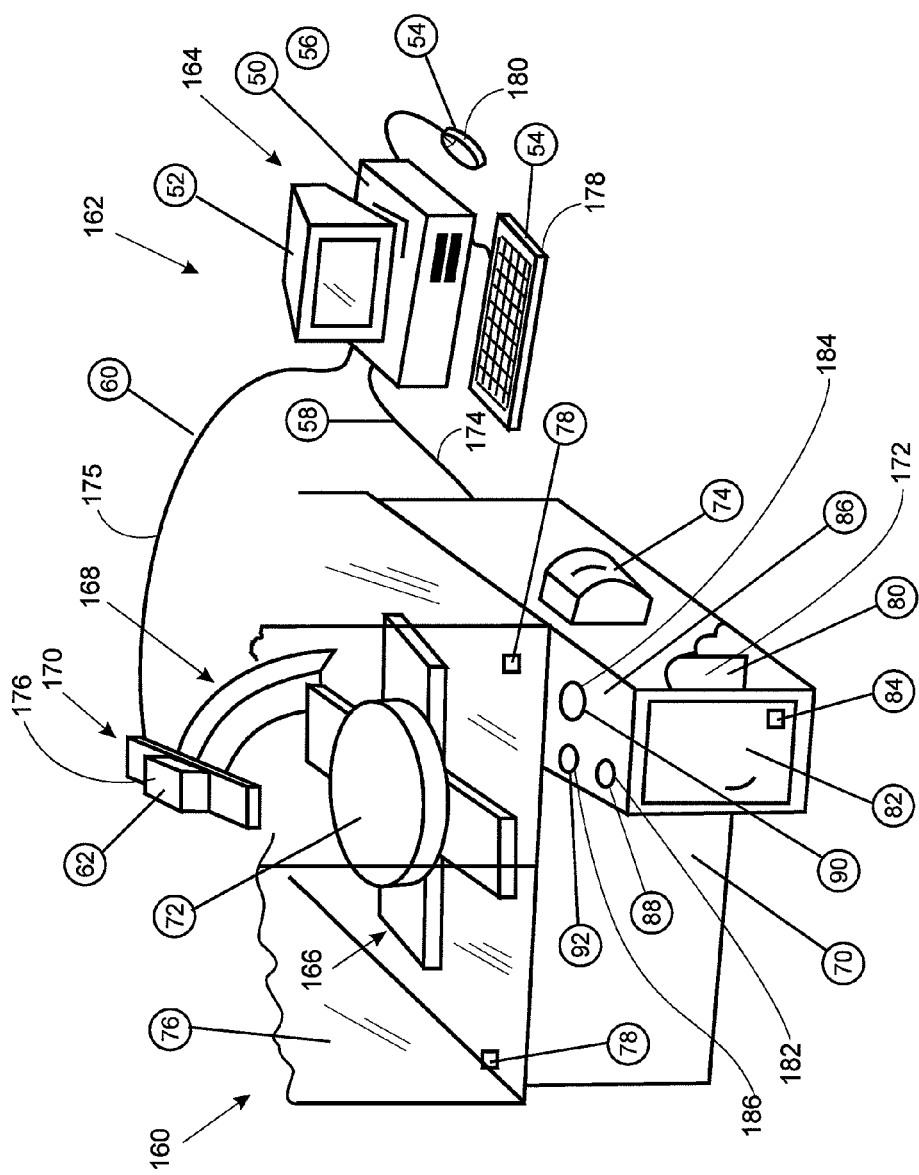
FIG. 12 is a partial isometric view of a non-contact scanning system in accordance with the present invention, shown connected to a host computer.
Figure 13:
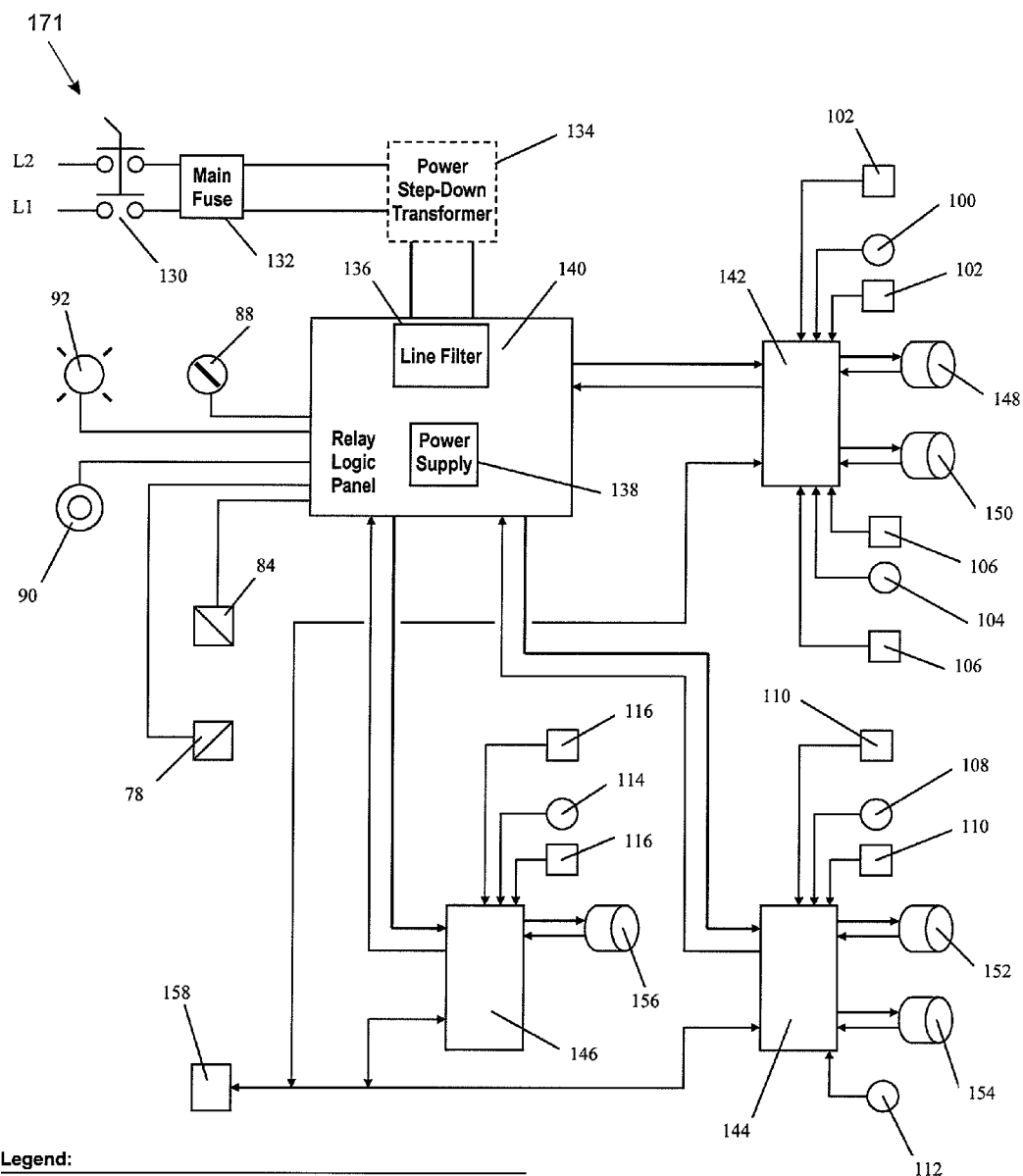
FIG. 13 is a block diagram of the non-contact scanning system in accordance with the present invention.

FIG. 12 is an exemplary embodiment of a non-contact scanning system 160, shown connected to a host computer system 162. A block diagram of the control system is illustrated in FIG. 13. Software flow diagrams for the control system are illustrated in FIGS. 14-21.

Turning to FIG. 12, the non-contact scanning system 160 includes a motorized fixture assembly 166, a gantry assembly 168 and a scanner assembly 170. The non-contact scanning system 162 is controlled by a control system which includes a motion control subsystem, an image capture subsystem, a motion control user interface subsystem and a host computer system 164.

The motion control subsystem 171 includes one or more motion control modules, and other circuitry, as illustrated In FIG. 11, mounted on an enclosed panel 172, either formed as part of the non-contact scanning system 162 or remote from it. The motion control subsystem 171 is interfaced to the host computer system 164 via a communication link. For example, a cable 174 may be used to connect the motion control subsystem 171 directly to an on-board Serial Port, Parallel Port, USB Port and Ethernet Port on the host computer system 164 or indirectly by wireless means. FIGS. 12 and 19 are software flow diagrams illustrating control of the motion control subsystem 171 by the host computer system 164.

Figure 16:
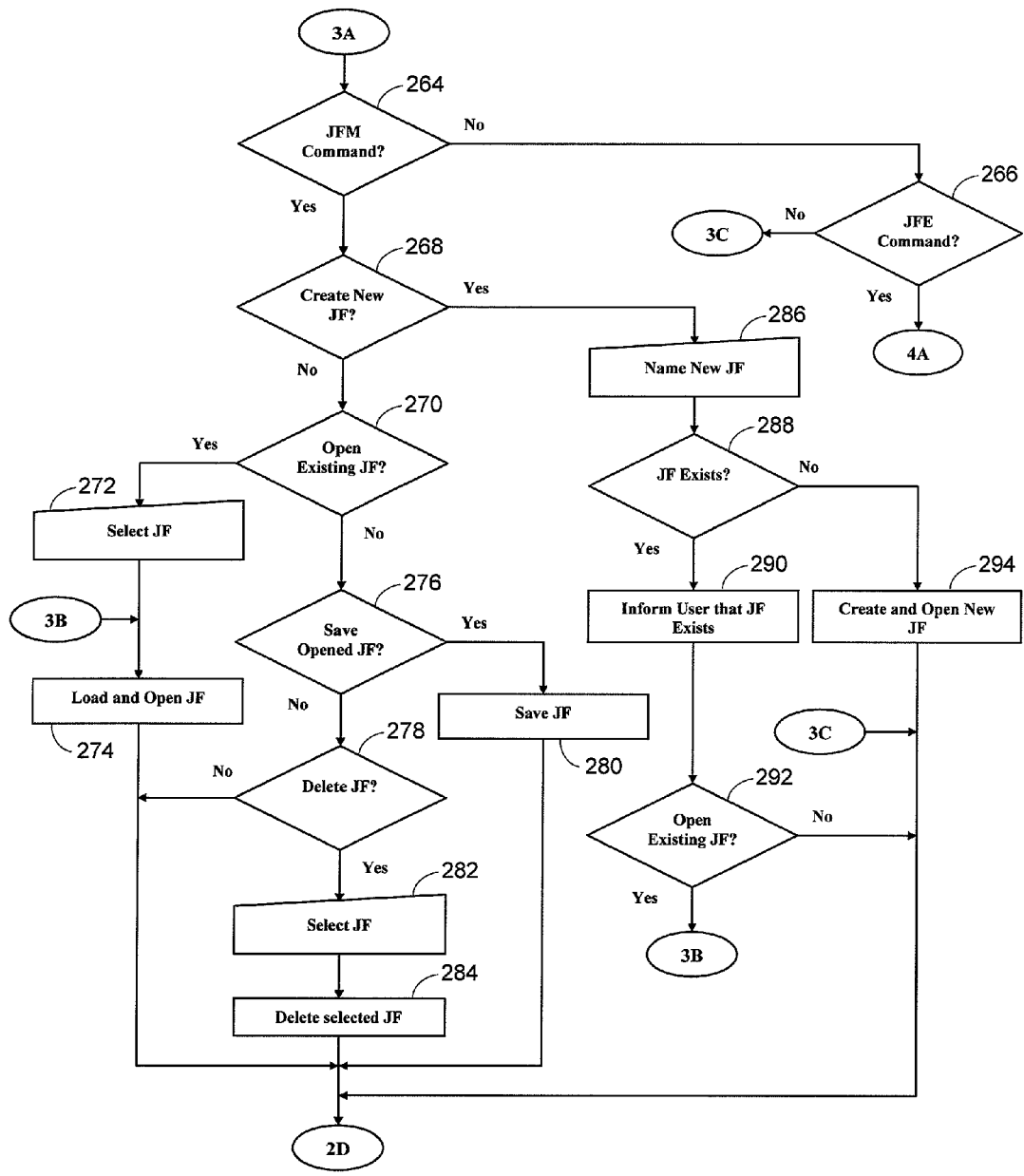
FIG. 16 is a flow diagram of the machine control user interface subsystem job file management commands.

The image capture control system may include a dedicated image capture control card (not shown), an image capture device 176 and an image capture and reconstruction program, for example, Polyworks Version 9 or better by Innovmetric. A conventional image capture control card, for example, normally included with the scanner as discussed above, may be connected to an expansion slot in the host computer system 164. A conventional scanner, for example, as discussed above, forms part of the scanner assembly, as discussed above. The function of the image capture and reconstruction program is to facilitate control of the image capture device and the manipulation and reconstruction of captured images of an object to create a 3-D model of the object. A cable 175 may be used to connect the image capture device 176 to the host computer system 164. FIG. 16 is a flow diagram of the scanner status query command.

The motion control user interface subsystem provides the user interface and control of the non-contact scanning system 162. In particular, the motion control user interface subsystem includes the user interfaces to control the motion of the fixture subsystem 166 and the gantry subsystem 168 via the motion control subsystem 171, and to facilitate internal communication between the host computer system 164 and the image capture subsystem to indirectly control the image capture device.

The motion control user interface subsystem includes motion control user interface program which runs on the host computer system 164, which may include various user input devices, such as a key board 178 and a mouse 180 or other input devices. The motion control user interface subsystem may also include various user interfaces to the motion control subsystem 171 such as, a panel mounted on-off switch with an indicator 182, an emergency stop switch 184 and one or more machine status indicating lights 186. The motion control user interface program constitutes a number of software programs to enable the host computer system to execute a number of commands as illustrated in FIGS. 15, 16, 19A, 19B and 20 and described below.

The non-contact scanning system can operate in one of three Modes of Operation, to control initialization, idle state, image capture and Job File, playback mode. The Job File has two functions: 1) is to sequentially store all the fixture assembly axis position after an image is captured, and to reference the captured image to that position, and 2) to automatically send a sequence of commands to the motion control subsystem and an image capture subsystem, under motion control user interface program control, to position the image capture device. This is so images of a similar object can be captured at the same positions as that of the original object.

Non-Contact Scanning System Modes of Operation

1. Initialization Mode
2. Idle Mode
3. Image Capture Mode
4. Playback Mode

Initialization Mode

Figure 14:
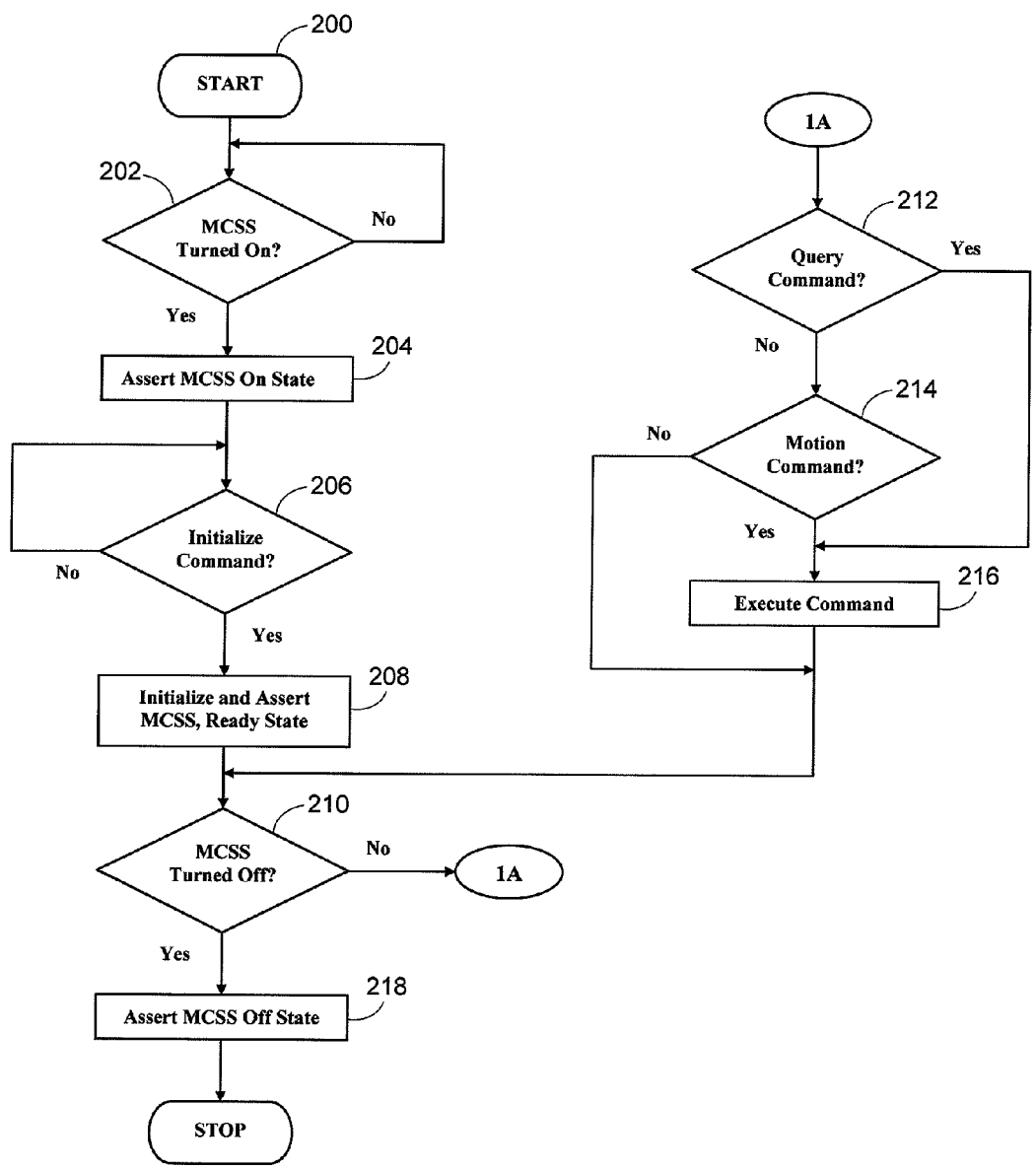
FIG. 14 is a flow diagram of a motion control subsystem, which forms a part of the present invention, illustrating the operation, control, start-up and shut down sequences.

Referring to FIG. 14, the initialization mode occurs as a result of power-up of the motion control subsystem 171 and the host computer system 164 as indicated in step 200. Ether the motion control subsystem 171 or host computer system 164 can be turned ON first. The system keeps checking in step 202 to determine whether the power to the motion control subsystem 171 has been turned ON, a motion control subsystem ON state is asserted in step 204 to inform the host computer system 164 of its' ON state. The system then proceeds to step 206 and waits for an Initialization command from the host computer system 164. As will be discussed below in connection with FIG. 13, after the host computer system 164 is powered up, it loads and runs the motion control user interface program. During execution of that program, the system checks if the motion control subsystem 171 has asserted its' ON state. If so, an Initialization Command is sent to the motion control subsystem 171. After receipt of the Initialize command, the motion control subsystem 171 performs its initialization and asserts its Ready State in step 208. After the ready state is asserted, the system waits for the motion control subsystem 171 to be turned off in step 210. In the mean time, the system checks in steps 212 and 214 for query and motion commands and executes those commands in step 216. Once the motion control subsystem 171 is turned off, a motion control subsystem off state is asserted in step 218.

Idle Mode

This mode is in effect after the system has completed its initialization sequence and is sitting idle, waiting for commands to be entered by the user via the various host computer system input devices. As discussed above in connection with FIG. 14. In this mode, Job File Management, Motion Control, and Motion Control+Image Capture commands can be entered and executed. Commands can be entered by the user, via the keyboard 178 (FIG. 12), mouse or trackball 180, or other input device.

Figure 15:
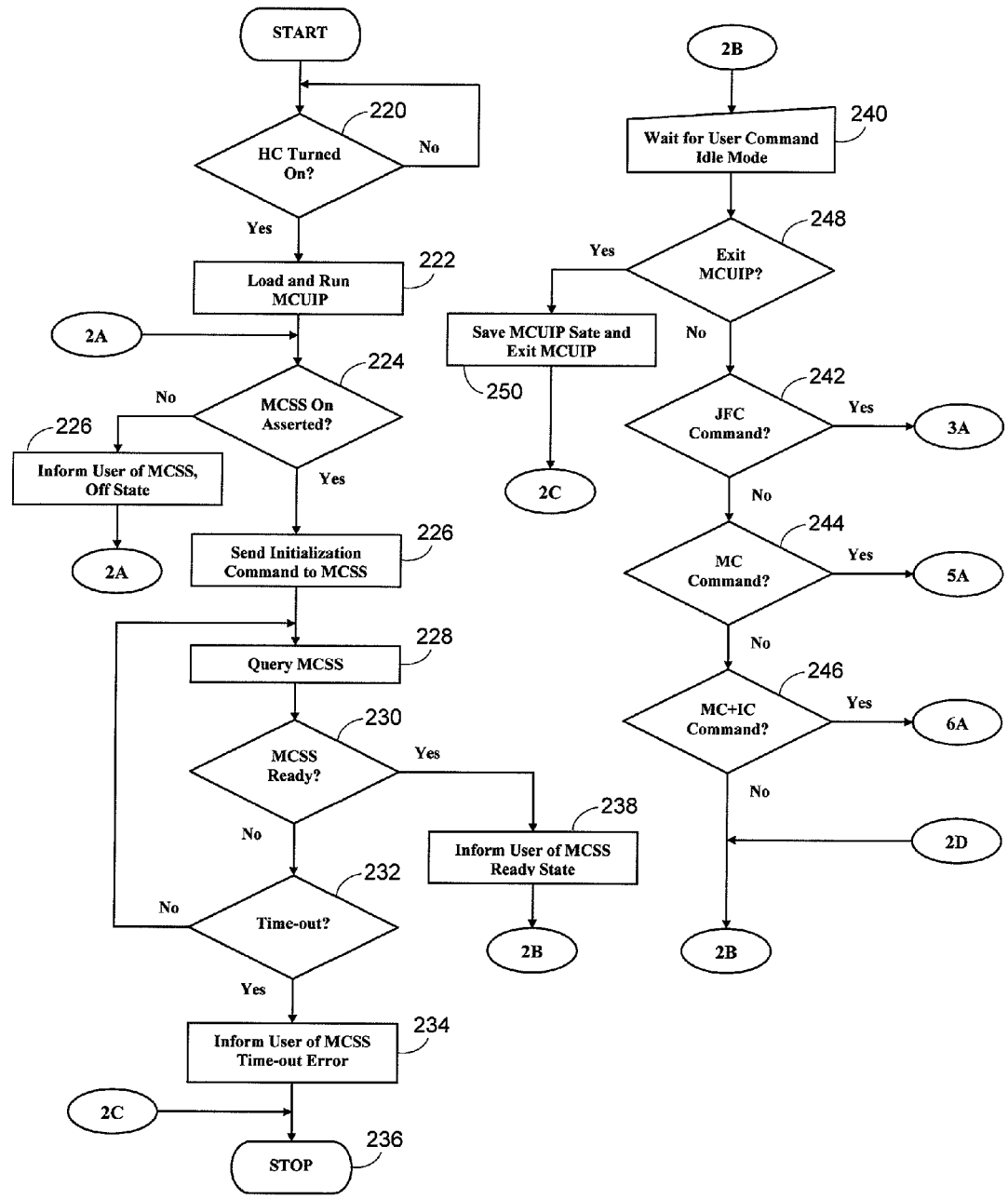
FIG. 15 is a flow diagram of a machine control user interface subsystem, which forms a part of the present invention, illustrating the operation, control, start-up and shut down sequences of that subsystem.

Referring to FIG. 15, the system waits for the power to be turned on in step 220. After the power is turned on, the system loads and runs the motion control user interface program in step 222, as discussed above. Subsequently in step 224, the system checks whether the motion control subsystem ON status has been asserted. If not, the system informs the user in step and waits for the motion control subsystem ON status to be asserted. Once the motion control subsystem ON status is asserted, an initialization command is sent to the motion control subsystem in step 226. The system follows up with a query in step 228 to determine if the motion control subsystem 171 completed its initialization in a predetermined amount of time in steps 230 and 232. If the motion control subsystem 171 does not complete its initialization process during the predetermined time period, the user is informed in step 234 and further program execution is halted in step 236.

If the motion control system 171 completes its initialization process within the predetermined time period and responds with a Ready state in step 238, the system enters the idle mode in step and waits for a user command. In the idle mode, the system can execute Job File Management, Motion Control and Image Capture Commands as indicated in steps 242, 244 and 246 as long as the motion control user interface program is running as determined in step 248. Any time the motion control user interface program is exited, its state is saved in step 250 and the system returns to step 236 and stops execution of program instructions.

Image Capture Mode

In this mode of operation, the user can specify the position that the image capture device 176 is to move to by entering the desired absolute or relative image capture device position. Automated, relative image capture device position increments and number of position increments can also be entered by the user. In this case, a single-image capture cycle consists of positioning the image capture device 176 and capturing the viewed image. During the motion of the image capture device 176, the viewed image is displayed on the display of the host computer 164 in real-time. Prior to capturing the viewed image, the host computer system 164 queries the image capture device 176 via the image capture control card to determine if the image capture device 176 is ready to capture the image. If the image capture device 176 is not ready, the host computer system will wait before sending the next motion command to the motion control subsystem 171. After the image capture device 176 captures the image, it will store the position of the entire axis in the Job File, and will send a command to the motion control subsystem 171 to move to the next camera position, if a next position was specified.

When all the images are captured, the host computer system 164 will close the Job File. The Job File will contain a list of all the camera positions and respective images used in capturing all the images of a 3-D object, to be further processed by the image capture and reconstruction program.

Figure 18:
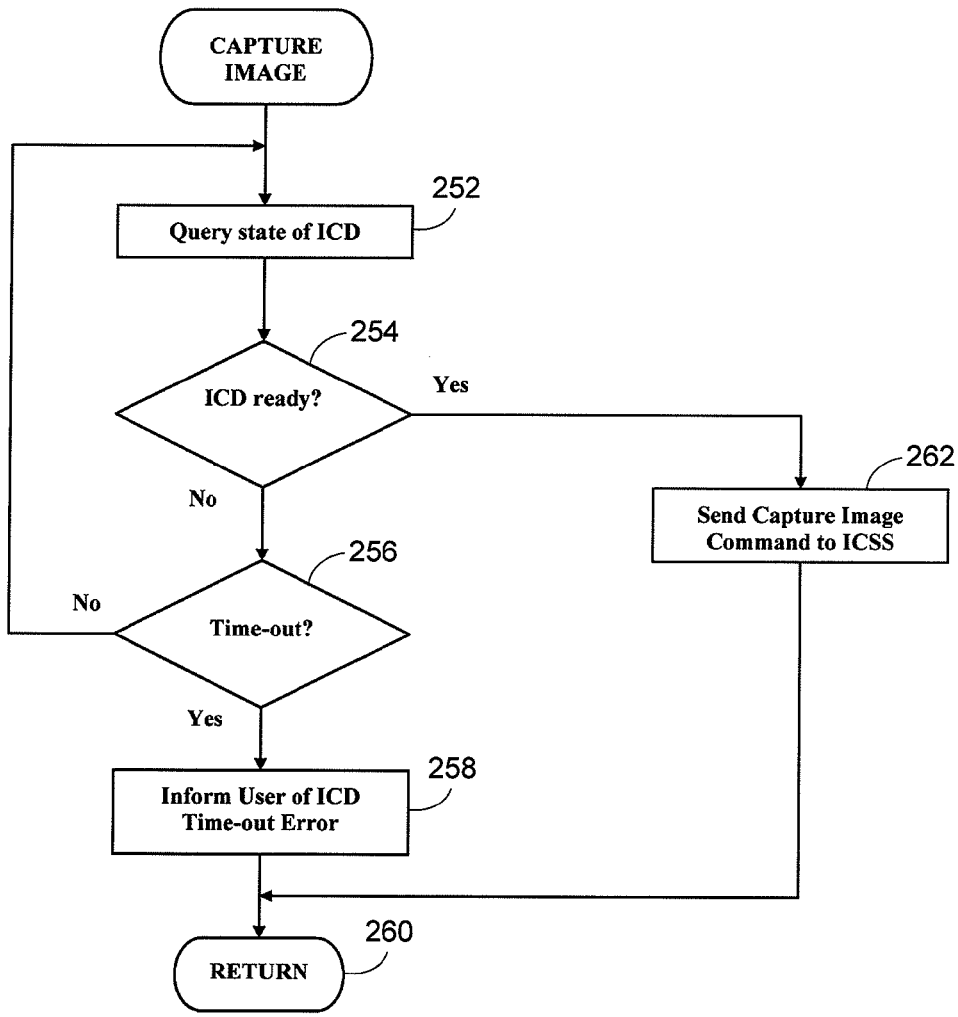
FIG. 18 is a flow diagram of the scanner status query command.

The Image Capture Mode logic flow is shown in FIG. 18. Turning to FIG. 18, in the capture mode, the system queries the state of the image capture device 171 in step and determines in step 254 whether the image capture device 176 is ready. If the image capture device 176 is not ready during a predetermined time-out period, as determined in step 256, an error message is provided to the user in step 258. The system then returns to the main program in step 260. However, during the time-out period, the system continuously checks the state of the image capture device 176 and loops back to step 252. When the image capture device 176 is ready, a capture image command is sent to the image capture subsystem.

Playback Mode

Figure 17:
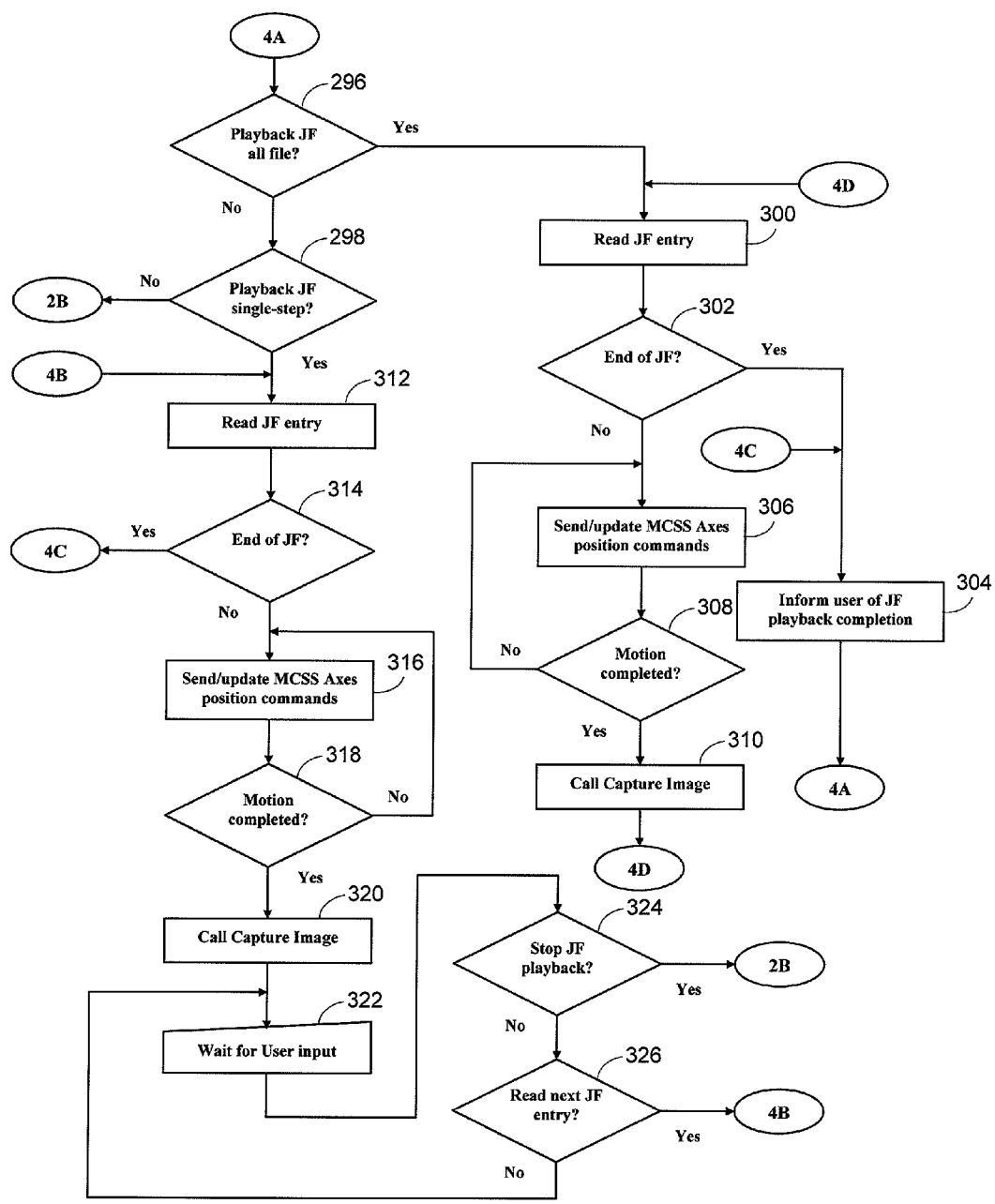
FIG. 17 is a flow diagram of the machine control user interface subsystem job file playback commands.

In this mode, the user selected Job File is played-back, so that all the images needed to subsequently generate a 3-D image of a similar physical part, can be automatically captured. Prior to the Job File play-back, a "Home All Axis" command is sent by the host computer system 164 to the motion control subsystem 171 and the image capture device 176 is queried to determine if it is ready to capture an image. The playback logic is illustrated in FIG. 17 and described below.

DESCRIPTION OF THE MOTION CONTROL USER INTERFACE PROGRAM

The motion control interface program facilitates operation of the non-contact scanning system 162 by controlling the motion control subsystem 171 and by providing the internal communication interface to the image capture subsystem via execution of user entered/initiated commands, or Job File playback. Commands are in turn sent to the motion control subsystem 171 or the image capture subsystem, or both. The motion control interface program command set is divided into two main sections: Job File Control (JFC) and Machine Control (MC).

Description of Motion Control User Interface
Program Commands

Job File Control

The Job File Control section divided into two sets of executable commands, as shown in FIGS. 14 and 15: Job File Management, and Job File Execution. Job File Management (JFM) is to facilitate the creation, loading, saving, deletion of Job Files (JF), and Job File Execution (JFE) is to facilitate the playback of previously created Job Files.

Job File Management (JFM) Commands:
1. New Job File (JFMC-001)
Allows the user to create and name a new Job File.
2. Open Job File (JFMC-002)
Allows the user the user to open an existing Job File.
3. Save Job File (JFMC-003)
Allows the user to save a newly created, or opened Job File.
4. Delete Job File (JFMC-004)
Allows the user to delete a selected Job File.

Job File Execution (JFE) Commands:
1. Playback Opened Job File, all file (JFEC-001)
This command allows the user to load a saved Job File for subsequent playback, in its' entirety. Each Job File entry is sequentially read and processed, to control the position that fixture assembly 166, image capture device 176 axis is to move to. Once the specified position is reached, a single image is captured by the image capture device 176. This cycle is repeated for all the entries in the Job File. The appropriate commands are sent by the motion control user interface program to the motion control subsystem 171 as each entry in the Job File is read.
2. Playback Opened Job File, single-step (JFEC-002)
This command is the same as command JFEC-001, but each Job File entry is single-stepped, under user control. This cycle may be repeated until all the Job File entries are processed.

The control logic for the Job File Management and Job File Execution commands is illustrated In FIGS. 16 and 17, respectively. Referring first to FIG. 16, the system checks for Job File Management and Job File Execution commands in steps 264. If a Job File Management command is detected, the system checks in steps 268 and 270 whether a new Job File command is to be created or whether an existing job file is to be opened. If a new Job File is to be opened, the system prompts the user to select a Job File to be opened in step 272 and loads and opens the selected Job File in step 274.

For existing Job Files, the system checks whether the Job File command is to save or delete an existing Job File in steps 276 and 278. If the command is to save a Job File, the Job File is saved in step. If the command is to delete a job file, the Job File is selected in step 282 and deleted in step 284.

If the system determines in step 268 that a new Job File is to be created, the user is prompted to name the new job file in step 286. The system then checks whether the user selected job file name already exists in step 288. If so, a user message is provided in step 290 so advising the user and the system queries whether the existing Job File is to be opened in step 292 and executes the user command. On the other hand, if the user selected Job File name does not already exist, a new Job File is created and opened in step 294.

Turning to FIG. 17, the system checks in steps 296 and 298 whether a Play Back Job File All File or a Play Back Job File Single Step command has been issued. If a Play Back All File Command is issued, the Job File entry is read in step 300 and the checks in step 302 whether the specified position has been reached by the fixture assembly 266 and a single image is captured by the image capture subsystem. Once a single image is captured, a Play Back completion message is sent to the user in step 304. while the fixture assembly is getting to the desired position, position commands are sent to the motion control subsystem 171 in step 306 until the specified position is reached, as determined in step 308. After the specified position is reached, the system calls the image capture and reconstruction program to have the image capture device 176 capture an image in step 310.

If the command is a Job File single step command, the Job File entry is read in step 312. The user single steps through the Job File until the last entry in the Job File is reached in step 314. For each step, position commands are sent to the motion control subsystem 171 to update the position of the fixture assemble 166 in step 316 until the final position is reached, as determined in step 318. Once the final position is reached, the system calls the image capture and reconstruction program to have the image capture device 176 capture an image in step 320.

For each step the Job File, a user prompt is generated in step 322. Unless the user enters a stop play back command, as determined in step 324, subsequent Job File entries are read, as determined in step 326 until the last entry in the job file is reached.

Machine Control

The Machine Control function is to initiate/monitor all internal commands of the host computer system 164, and to control/monitor all the fixture assembly 166 axis motion/position, by sending specific commands to one or more motion control modules, as discussed above. The motion control modules control the appropriate motor(s) to move the image capture device to the specified spatial position. Query, Initialization and Image Capture Commands:
1. Query State of Image Capture Device, "Ready State" (QC-001)
This is an internal command within the host computer system 164 sent by the motion control user interface program to the image capture subsystem via its image capture control card and the image capture and reconstruction program to determine if the image capture device 176 is ready to capture an image. If the image capture device 176 responds with a "Ready State", a command to capture the image is sent by the motion control user interface program to the image capture subsystem. If the image capture subsystem does not respond with a "Ready State" within a predefined time, the user is informed accordingly.
2. Capture Image (CIC-001)
This is an internal command within the host computer system 164 sent by the motion control user interface program to the image capture subsystem, after the image capture subsystem has asserted an image capture device "Ready State", and instructs the image capture subsystem to captured the viewed image.
3. Query State of Motion Control Sub-system, "ON/OFF State" (QC-002)
This is a command sent by the motion control user interface program to the motion control user interface program, to query the "ON/OFF State" of the motion control subsystem. The motion control user interface program will wait for the assertion of the "ON/OFF State" before sending an "Initialize motion control subsystem" Command to the motion control system 171.
4. Query State of Motion Control Sub-system, "Ready State" (QC-003)

This is a query command sent by the motion control interface program to the motion control subsystem 171 to determine if the motion control subsystem 171 has properly initialized. After proper initialization, the motion control subsystem 171 asserts a "Ready State." to inform the motion control interface program of its' state. The motion control interface program will in turn enter the "Idle Mode" of operation, and will wait for user's entered commands. If the motion control subsystem 171 does not assert a "Ready State" within a predefined time, the motion control interface program will inform the user of motion control subsystem 171 fault state.

5. Initialize MCSS (IC-001)

This is a command sent by the motion control interface program to the motion control subsystem 171, after it receives the "Ready State" assertion from the motion control subsystem 171.

Motion Control (MC) Commands:

1. Home All Axis (MCC-001)

This is a command sent by the motion control interface program to the motion control subsystem 171, to send all fixture assembly 166 axes to their respective home position. While the fixture assembly 166 axes are in motion the motion control interface program, via the motion control subsystem 171, determines when the fixture assembly 166 axes have reached their respective home-position.

2. Home Axis (MCC-002)

This command is the same as command MCC-001, but only the user specified motion control subsystem 171 axis is moved to its home position.

3. Move Axis by Distance or Angle (MCC-003)

This is a command sent by the motion control interface program to the motion control subsystem 171, to move a user specified fixture assembly 166 axis by a specified distance. The motion control interface program, via the motion control subsystem 171, determines when the specified fixture assembly 166 axis has moved by the specified distance. If the Table Axis is specified, the table is rotated by the specified angle.

4. Go-to 3-D Position, all axis except Table Axis (MCC-004)

This is a command sent by the motion control interface program to the motion control subsystem 171, to move the appropriate fixture assembly 166 axis to a user specified 3-D space location. The motion control interface program, via the motion control subsystem 171, determines when the fixture assembly 166 axes have reached the specified 3-D space location.

5. Go-to 3-D Position, not to include Image Capture Device focus axis or Table Axis (MCC-005)

This command is the same as command MCC-004, but the image capture device 176 focus axis remains at the same position.

6. Go-to Axis Position or Angle, single axis (MCC-006)

This command is the same as command MCC-004, but only a user specified fixture assembly 166 axis is moved. If the Table Axis is specified, the table is rotated by the specified angle.

7. Jog Axis Position or Angle (MCC-007)

This is a command sent by the motion control interface program to the motion control subsystem 171, to "Jog" a user specified fixture assembly 166 axis in a specified direction, by a specified distance. If the Table Axis is specified, the table is "Jogged" by the specified angle. Jog motion starts or stops by pressing or releasing the HC input device.

Motion Control+Image Capture (MC+IC) Commands:

1. Increment Axis Distance or Angle, and Capture Image (MCICC-001)

This is a command sent by the motion control interface program to the motion control subsystem 171, to move a specified fixture assembly 166 axis by a specified distance. If the Table Axis is specified, the table is rotated by the specified angle. After axis motion stops, it will capture the image capture device 176 viewed image. On completion of this command, the motion control interface program will wait for user input, to repeat the cycle.

2. Increment Axis by Distance or Angle, Capture Image, and Repeat (MCICC-002)

This is a command sent by the motion control interface program to the motion control subsystem 171, to move a specified fixture assembly 166 axis by a specified distance or angle. If the Table Axis is specified, the table is rotated by the specified angle. After axis motion stops, it will capture the image capture device viewed image. This cycle will repeat for a user specified number of times.

Figure 19A:
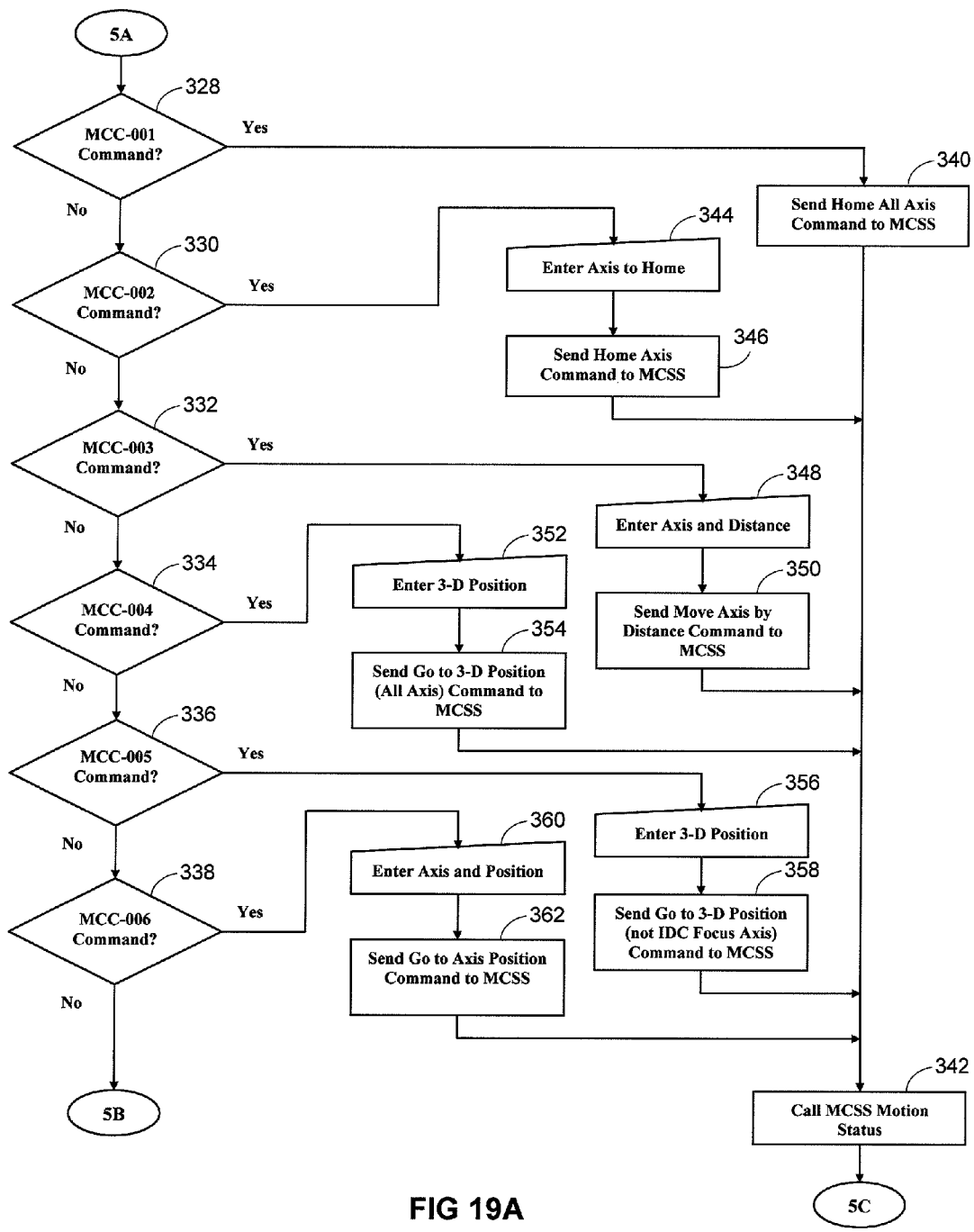
FIGS. 19A and 19B is a flow diagram of machine control user interface subsystem motion control commands.
Figure 19B:
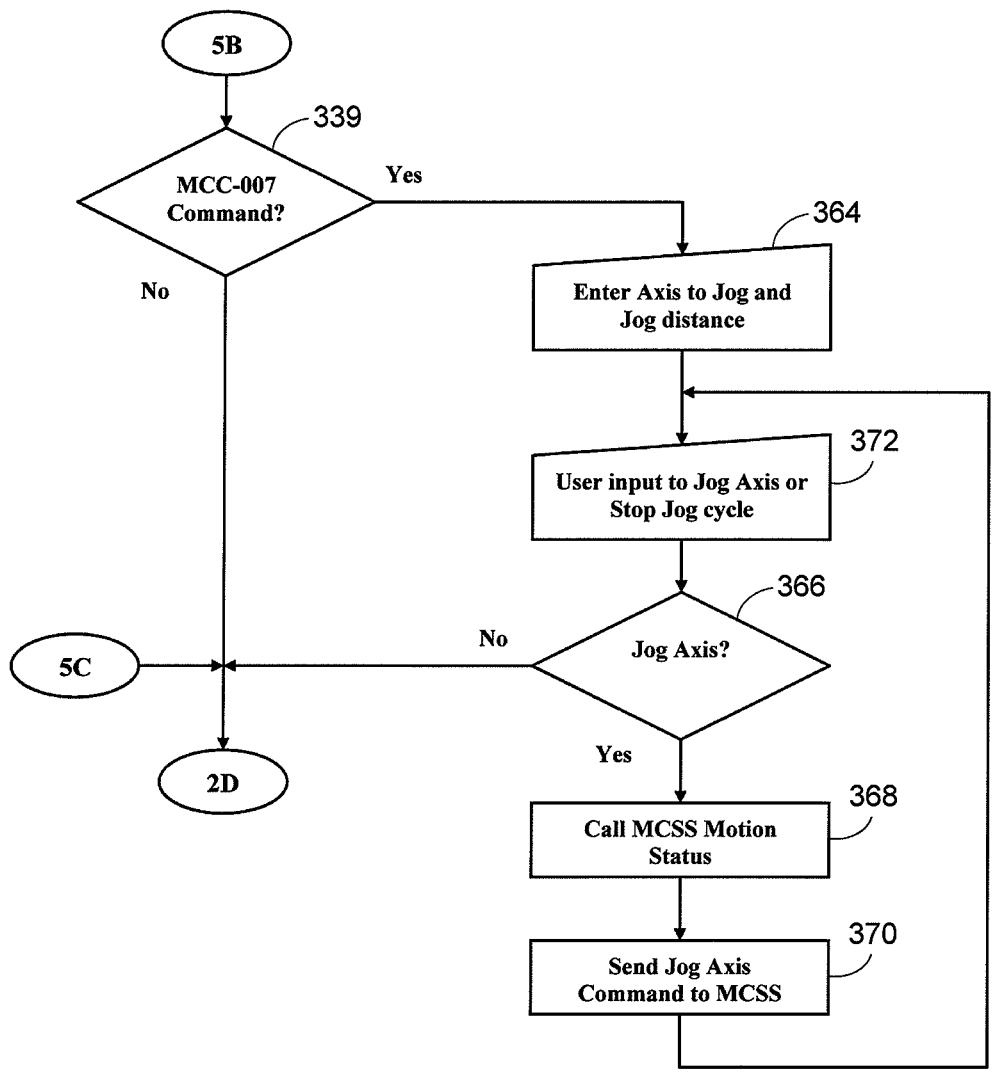

The machine control logic is shown in FIGS. 19A, 19B 20 and 21. Turning to FIGS. 19A and 97B, the system checks for motion control commands to the motion control subsystem in steps 328, 330, 332, 334, 336, 338 and 339. If a MCC-001 is detected in step 328, a Home All Axis Command is sent to the motion control subsystem 171, as discussed above. Subsequently, a call is made to the motion control subsystem to determine its status in step 280. If a MCC-002 command is detected in step 330, a user prompt is generated in step 344 to enter axis to home. After the user response is received, a home axis command is sent to the motion control subsystem 171 in step 346 and the system returns to step 342. If a MCC-003 command is detected in step 332, a user prompt is generated in step 348 for the user to enter the axis and distance. Once the user response is detected, a move axis by distance command is sent to the motion control subsystem 171 in step 350 and the system returns to step 342. If a MCC-004 command is detected in step 334, a user prompt is generated in step 352 for the user to enter a 3 dimensional position. Once the user response is detected, a go to 3 dimensional position all axis command is sent to the motion control subsystem 171 in step 354 and the system returns to step 342. If a MCC-005 command is detected in step 336, a user prompt is generated in step 356 for the user to enter a 3 dimensional position not including the focus axis. Once the user response is detected, a go to 3 dimensional position command is sent to the motion control subsystem 171 in step 358 and the system returns to step 342. If a MCC-006 command is detected in step 338, a user prompt is generated in step 360 for the user to enter the axis and distance. Once the user response is detected, a go to axis and position command is sent to the motion control subsystem 171 in step 362 and the system returns to step 342. If a MCC-007 command is detected in step 339, a user prompt is generated in step 364 for the user to enter the axis to jog and the jog distance and checks the in step 366. Once the user response is detected, the system checks whether a jog axis has been specified in step 366. If so, a call is made to the motion control subsystem 171 in step 368 and a send jog axis command is sent to the motion control subsystem 171 in step 370. The system returns to step 372 and prompts the user for another jog axis or stop jog cycle command.

Figure 20:
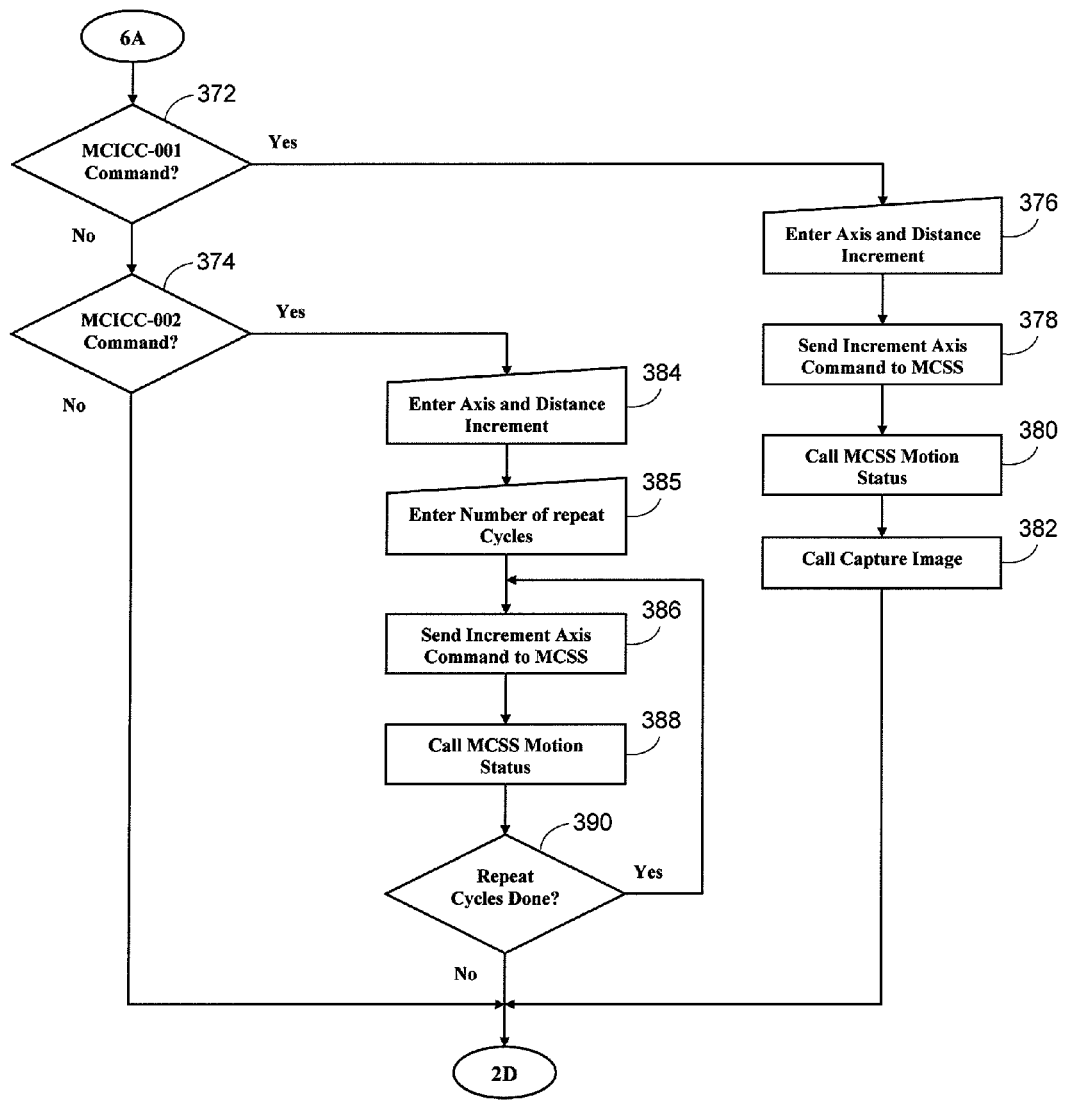
FIG. 20 is a flow diagram of machine control user interface subsystem motion control and image capture commands.

Turning to FIG. 20, the system checks for MCICC-001 and MCCICC-002 commands in steps 372 and 374. If a MCCICC-001 command is detected, a user prompt is generated in step 376 requesting the user to enter axis and distance increment information. After the user response is detected, a send increment axis command is sent to the motion control subsystem 171 in step 378. Subsequently calls are made in steps 380 and 382 to check the status of the motion control subsystem 171 and capture the image.

If a MCICC-002 command is detected in step 374, a user prompt is generated in step 384 requesting the user to enter the axis and distance increment and to enter the number of repeat cycles in step 385. After the user information is detected, an increment axis command is sent to the motion control subsystem 171 in step and a call is made to determine the status of the motion control subsystem 171 in step 388. In step 390, the system checks if the repeat cycles are done. If not, the system loops back to step 386 and repeats steps 386 and 388.

Figure 21:
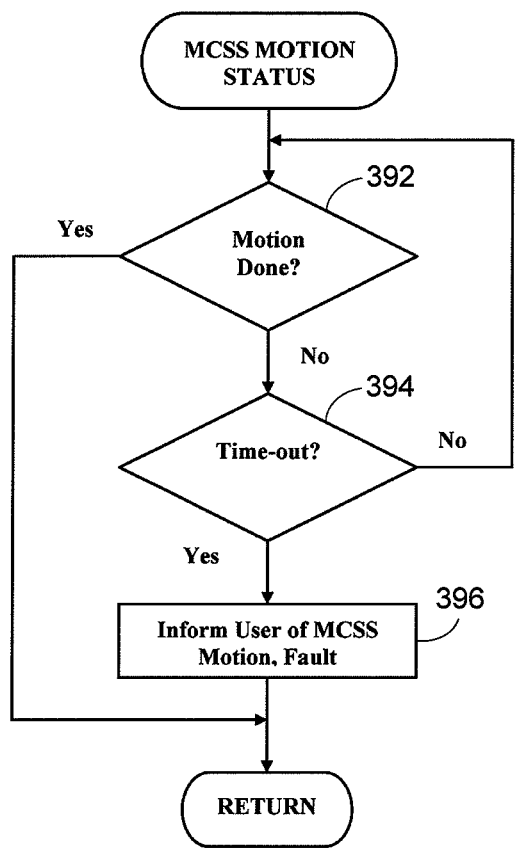
FIG. 21 is a flow diagram of a motion control subsystem status query command.

FIG. 21 illustrates the control logic for the motion control subsystem status function. Each time a call is made to check the status of the motion control subsystem 171, the system checks in step 392 whether the requested motion is complete. If so, the system returns that the motion is complete. If not, the system checks in step 394 whether the requested motion has been completed during a predetermined time period. If not an error message is sent to the user in step 396.

MOTION CONTROL SUBSYSTEM SCHEMATIC

An exemplary schematic diagram for the motion control subsystem 171 is illustrated in FIG. 13. A key for the various components is provided below.
- 50 Host Computer
- 52 Host Computer Display Unit
- 54 User to Host Computer Input Device
- 56 Image Capture Card
- 58 Host Computer to Motion Control Sub-system Interface/Signal Link
- 60 Host Computer to Motion Image Capture Device Interface/Signal Link
- 62 Image Capture Device
- 70 Semi-Spherical Gantry
- 72 Motorized Multi-axis Platform
- 74 Power Disconnect Box
- 76 Gantry Access Doors
- 78 Gantry Access Door, Interlock Switch
- 80 Motion Control Sub-system Panel
- 82 Motion Control Sub-system Panel Door
- 84 Motion Control Sub-system Panel Door, Interlock Switch
- 86 User Control Panel
- 88 ON/OFF Switch with Indicator
- 90 Emergency Stop Switch
- 92 Gantry In-Motion Indicator
- 100 X-Axis Home Position Sensor
- 102 X-Axis Bumper Sensor
- 104 Y-Axis Home Position Sensor
- 106 Y-Axis Bumper Sensor
- 108 AR-Axis (Arm Rotation Axis) Home Position Sensor
- 110 AR-Axis (Arm Rotation Axis) Bumper Sensor
- 112 R-Axis (Rotary Axis) Home Position Sensor
- 114 Z-Axis (Image Capture Device Focus Axis) Home Position Sensor
- 116 Z-Axis (Image Capture Device Focus Axis) Bumper Sensor
- 130 Power Disconnect Switch
- 132 Main Fuses
- 134 Power Step-Down transformer
- 136 Line Filter
- 138 Power Supply
- 140 Relay Logic Panel
- 142 X-Axis and Y-Axis Motion Control Module
- 144 AR-Axis (Arm Rotation Axis) and Rotary-Axis Motion Control Module
- 146 Z-Axis (Image Capture Device Focus Axis) Motion Control Module
- 148 X-Axis Motor
- 150 Y-Axis Motor
- 152 AR-Axis (Arm Rotation Axis) Motor
- 154 R-Axis (Rotary Axis) Motor
- 156 Z-Axis (Image Capture Device Focus Axis) Motor
- 158 Host Computer to Motion Control Sub-system Interface/Signal Connector

OPERATION

Operation of the non-contact scanning system is user initiated by applying power to both the motion control subsystem 171 and the host computer system 164, via their respective ON/OFF switch. Once the host computer system 164 is ON, it will automatically load and run the motion control user interface program. The turn ON order is not important, since operation of the fixture assembly 166 can only take place after the host computer system 164 has completed the "Initialization Mode of Operation."

After the motion control subsystem 171 has properly initialized, the motion control user interface program will enter the "Idle Mode of Operation". In this mode, the motion control user interface program sits idle, and waits for a user command. Once a command is entered, the motion control user interface program will interpret the command, and will responds accordingly, to execute the command. The user can enter one of several commands to create, open, save, delete, or execute a Job Files. The user can also enter one of several commands to manually or automatically (via execution of a Job File) control the motion of the fixture assembly 166 axis, and the image capture of an object, resting on the fixture assembly 166 table axis Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

1. A non-contact scanning system comprising:
a common base for carrying said fixture assembly and said gantry assembly;
a fixture assembly for carrying a work piece to be scanned; said fixture assembly moveably mounted relative to said common base to provide at least three degrees of freedom of movement relative to said common base,
a scanner assembly for scanning a work piece, said scanner assembly including a slide assembly and a scanner that is moveably mounted relative to said slide assembly; and
a gantry assembly, carried by said common base, said gantry assembly for carrying said scanner assembly so that the workpiece carried by said fixture assembly can be viewed by said scanner assembly, said gantry assembly including a radius arm formed in a generally arcuate shape that enables the angle of the scanner assembly to be varied relative to the workpiece; wherein the scanning system is able to make a three dimensional image of the workpiece.

2. The non-contact scanning system as recited in claim 1, wherein one of said degrees of freedom of said fixture assembly is rotation.

3. The non-contact scanning system as recited in claim 1, wherein one of said degrees of freedom of said fixture assembly is rotation about a vertical axis generally perpendicular to the plane of said base.

4. The non-contact scanning system as recited in claim 1, wherein one of said degrees of freedom of said fixture assembly is linear motion.

5. The non-contact scanning system as recited in claim 1, wherein said fixture assembly is moveably mounted relative to said base to provide four degrees of freedom of movement relative to said base.

6. The non-contact scanning system as recited in claim 1, wherein said scanner assembly is moveable mounted to provide at least two degrees of movement relative to said slide.

7. The non-contact scanning system as recited in claim 1, wherein said scanner assembly is rotatably mounted relative to said slide.

* * * * *